(12) United States Patent
Kondo et al.

(10) Patent No.: US 6,502,155 B1
(45) Date of Patent: Dec. 31, 2002

(54) RADIO NETWORK AND METHOD OF ESTABLISHING TIME SYNCHRONIZATION AMONG A PLURALITY OF BUSES

(75) Inventors: Keitaro Kondo, Kanagawa (JP); Masatoshi Ueno, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/449,977

(22) Filed: Nov. 26, 1999

(30) Foreign Application Priority Data

Nov. 30, 1998 (JP) .......................................... 10-340559

(51) Int. Cl.[7] .......................... G06F 13/00; G06F 13/38
(52) U.S. Cl. ...................... 710/305; 709/253; 455/403
(58) Field of Search ................................ 710/105, 305; 709/400, 248, 253; 370/464, 400; 455/403; 707/104.1; 713/500

(56) References Cited

U.S. PATENT DOCUMENTS 5,475,681 A * 12/1995 White et al.
5,734,891 A * 3/1998 Saigh
5,867,688 A * 2/1999 Simmon et al.

* cited by examiner

Primary Examiner—Gopal C. Ray
(74) Attorney, Agent, or Firm—Jay H. Maioli

(57) ABSTRACT

WN nodes (2 to 5) set the number of clocks in low-order 12 bits of cycle time data from cycle masters (20–50) to a bus counter (102A) and an internal counter (102B). When a control block is transmitted to the WN nodes (3 to 5), the WN node (2) stores a counted value of the counter (102B) in a cycle sync area. The WN nodes (3 to 5) which receive the control block extract the counted value from the cycle sync area, generate control information for correcting a difference so as to maintain an initial value by comparing the extracted counted value and the counted value of the above-mentioned counter (102A), and transmits such control information to the cycle masters (30 to 50). Thus, the number of clocks in the low-order 12 bits of the cycle time data in the cycle masters (30 to 50) is corrected, and a time synchronization among respective buses is established. Therefore, a time synchronization among a plurality of buses may be established satisfactorily.

6 Claims, 18 Drawing Sheets

| QPSK | 4 | 48 | 8 |
|---|---|---|---|
| 16QAM | 4 | 100 | 16 |
| 256QAM | 4 BYTES | 204 BYTES | 32 BYTES |
| | HEADER | USER DATA (IEEE1394) | PARITY |

FIG. 6A

| PACKET ID | SOURCE | DATA LENGTH | KINDS OF DATA | DIVIDE INFORMATION | RESERVE |
|---|---|---|---|---|---|

FIG. 6B

| HEADER | USER DATA | HEADER | USER DATA | PARITY |
|---|---|---|---|---|

FIG. 6C

| HEADER | USER DATA | NULL DATA | PARITY |
|---|---|---|---|

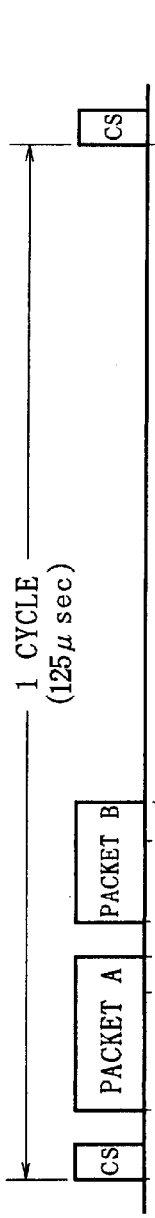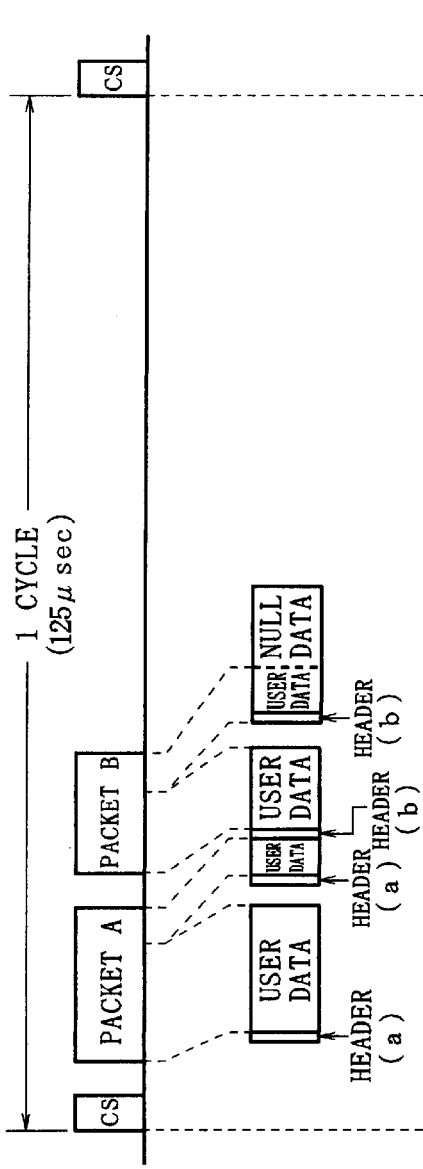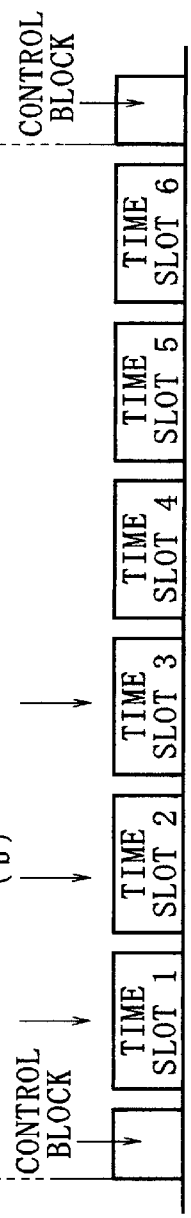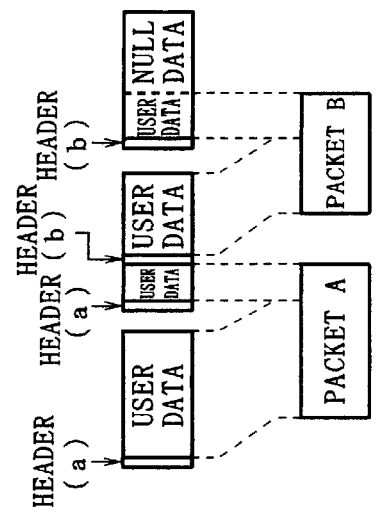
F I G. 1 2 A  PACKET DATA
F I G. 1 2 B  DATA BLOCK
F I G. 1 2 C
F I G. 1 2 D
F I G. 1 2 E  REARRANGEMENT OF PACKET DATA

RADIO NETWORK AND METHOD OF ESTABLISHING TIME SYNCHRONIZATION AMONG A PLURALITY OF BUSES

BACKGROUND OF THE INVENTION

1. Field of the Invention

The present invention relates to a radio network using infrared rays, radio waves and the like as a radio communication medium and a method of establishing a time synchronization among a plurality of buses. More particularly, this invention relates to a radio network in which a time synchronization may be satisfactorily established among a plurality of buses by adjusting a time of other bus based on time information of one bus.

2. Description of the Related Art

Heretofore, an IEEE (Institute of Electrical and Electronics Engineers) 1394 bus receives a remarkable attention as a multimedia bus suitable for connecting home electronic devices such as digital video recorders or connecting these electronic devices to a computer.

This IEEE1394 bus has two kinds of data transfer functions of asynchronous transfer function and isochronous transfer function. According to the asynchronous transfer function, an asynchronous communication of data is carried out in a memory-mapped I/O system. On the other hand, according to the isochronous transfer function, data communication is carried out by using channel numbers previously-set on the transmission side and the reception side, and an isochronous communication is carried out at the unit of 125 microseconds.

It is proposed that a radio network comprises a plurality of the above-mentioned IEEE1394 buses, for example, connected over radio waves to thereby transmit and receive video data and audio data among respective buses. Each bus includes a time management node, which is generally referred to as a cycle master, to manage a time of each bus. A time of each bus is counted by using a clock signal having a certain degree of accuracy. However, since there exists a constant error among clock signals, when a time is continuously counted to some extent, it is unavoidable that a time difference among respective buses is shifted. As described above, when video data and audio data are transmitted and received among respective buses, a displacement of a time difference among the respective buses exerts a bad influence upon reproduced pictures and sounds as a jitter component.

SUMMARY OF THE INVENTION

It is an object of the present invention to provide a radio network in which a time synchronization may be satisfactorily established among a plurality of buses.

A radio network according to the present invention is a radio network comprising a plurality of buses connected over radio waves and which includes means for adjusting a time of other bus by using time information of one bus.

The radio network according to the present invention, for example, includes a radio communication unit for effecting a radio communication among a plurality of buses. This radio communication unit comprises one control node and more than one controlled nodes controlled by this control node and wherein the control node is connected to one bus and the controlled node is connected to other bus.

The control node transmits time information from a time management node on a bus connected thereto to the controlled node. Then, the controlled node generates control information for adjusting a time by using time information transmitted from the control node and time information from a time management node on a bus connected thereto, and transmits such control information to a time management node on a bus connected thereto, whereby a time synchronization of buses to which the control node and the controlled node are connected may be established.

Also, the radio network according to the present invention, for example, includes a radio communication unit for effecting a radio communication among a plurality of buses. This radio communication unit comprises one control node and more than one controlled nodes controlled by this control node and wherein a controlled node is connected to one bus and a control node and a controlled node are connected to other buses.

The control node transmits time information from a time management node on a bus connected thereto to a controlled node. The controlled node connected to a bus other than one bus generates control information for adjusting a time by using time information transmitted from a control node and time information from a time management node on a bus connected thereto, and transmits such control information to a time management node on a bus connected thereto.

The controlled node connected to one bus generates control information by using time information transmitted from a control node and time information from a time management node on a bus connected thereto, and transmits such control information to a control node. Then, the control node receives control information transmitted from a controlled node connected to one bus, and transmits such control information to a time management node on a bus connected thereto, whereby a time synchronization of buses to which the control node and the controlled node are connected may be established.

BRIEF DESCRIPTION OF THE DRAWINGS

FIGS. 6A, 6B, 6C are diagrams showing the kinds of data blocks and the contents of headers, respectively;

FIGS. 12A through 12E are diagrams used to explain the manner in which a data block is converted and a packet is reconfigured, respectively;

DESCRIPTION OF THE PREFERRED EMBODIMENT

An embodiment of the present invention will hereinafter be described with reference to the drawings.

Figure 1:
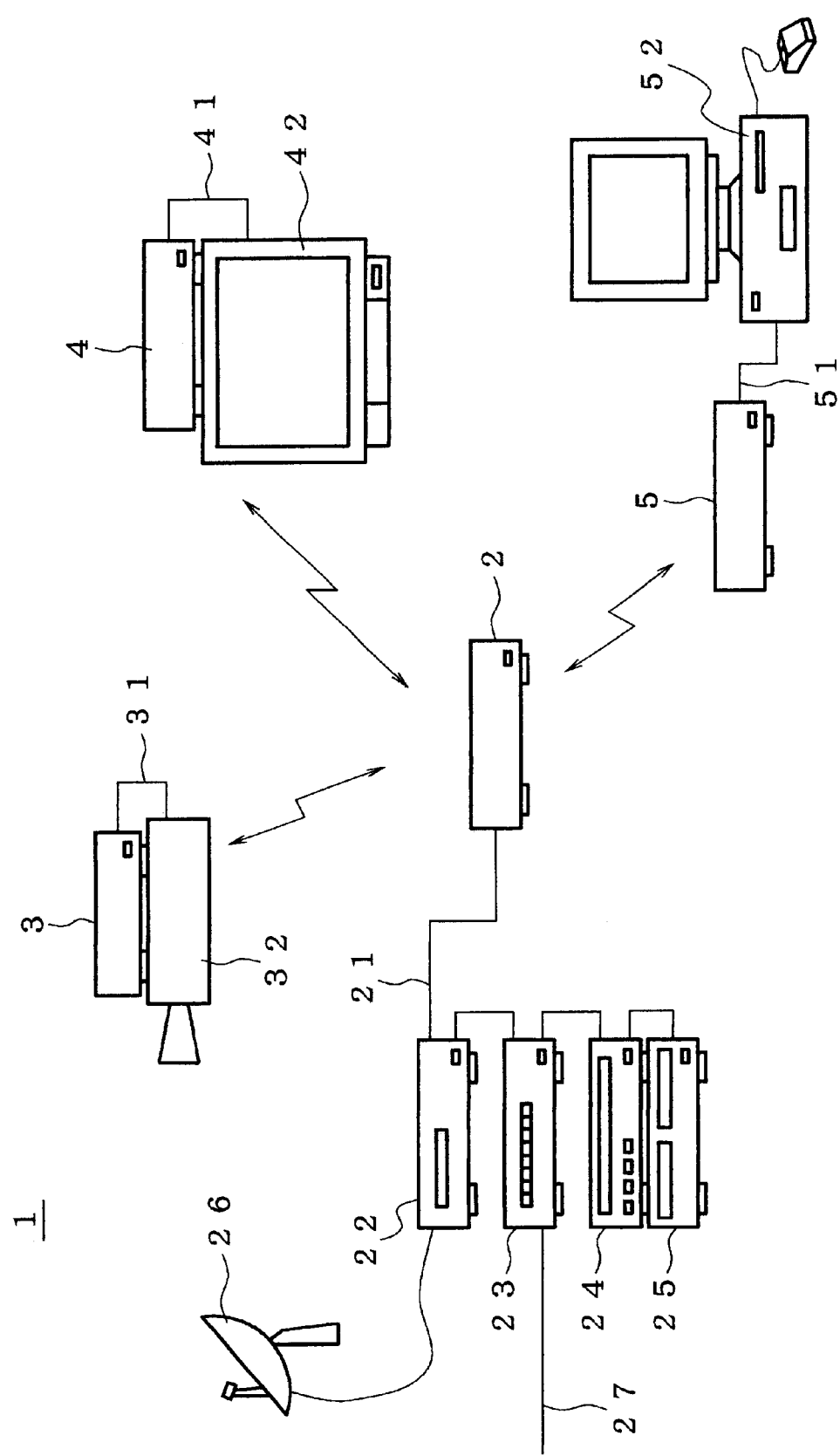
FIG. 1 is a systematic diagram showing a radio network according to an embodiment of the present invention.

FIG. 1 of the accompanying drawings shows an example of a radio network 1 using infrared rays as a radio communication medium. As shown in FIG. 1, this radio network 1 includes four radio network nodes (hereinafter simply referred to as "WN nodes") 2 to 5.

The WN node 2 is connected to an IEEE1394 bus 21. This IEEE1394 bus 21 has further connected thereto a satellite broadcasting receiver 22, a CATV (cable television) receiving device (what might be called set-top box) 23, a digital video disk (DVD) device 24 and a video cassette recorder (VCR) 25, all of which are served as IEEE1394 nodes. The satellite broadcasting receiver 22 has connected thereto an antenna 26 for receiving a satellite broadcasting signal. The CATV receiving device 23 has connected thereto a cable 27 through which a CATV signal is transmitted.

The WN node 3 is connected to an IEEE1394 bus 31. This IEEE1394 bus 31 has further connected thereto a video camera 32 serving as an IEEE1394 node. The WN node 4 is connected to an IEEE1394 bus 41. The IEEE1394 bus 41 has further connected thereto a monitor 42 serving as an IEEE1394 node. The WN node 5 is connected to an IEEE1394 bus 51. The IEEE1394 bus 51 has further connected thereto a computer 52 served as an IEEE1394 node.

In the radio network shown in FIG. 1, when data is transferred from the first node connected to a certain WN node to the second node connected to other WN node, data is converted into an infrared signal, and transferred from the first node to the second node.

Figure 3:
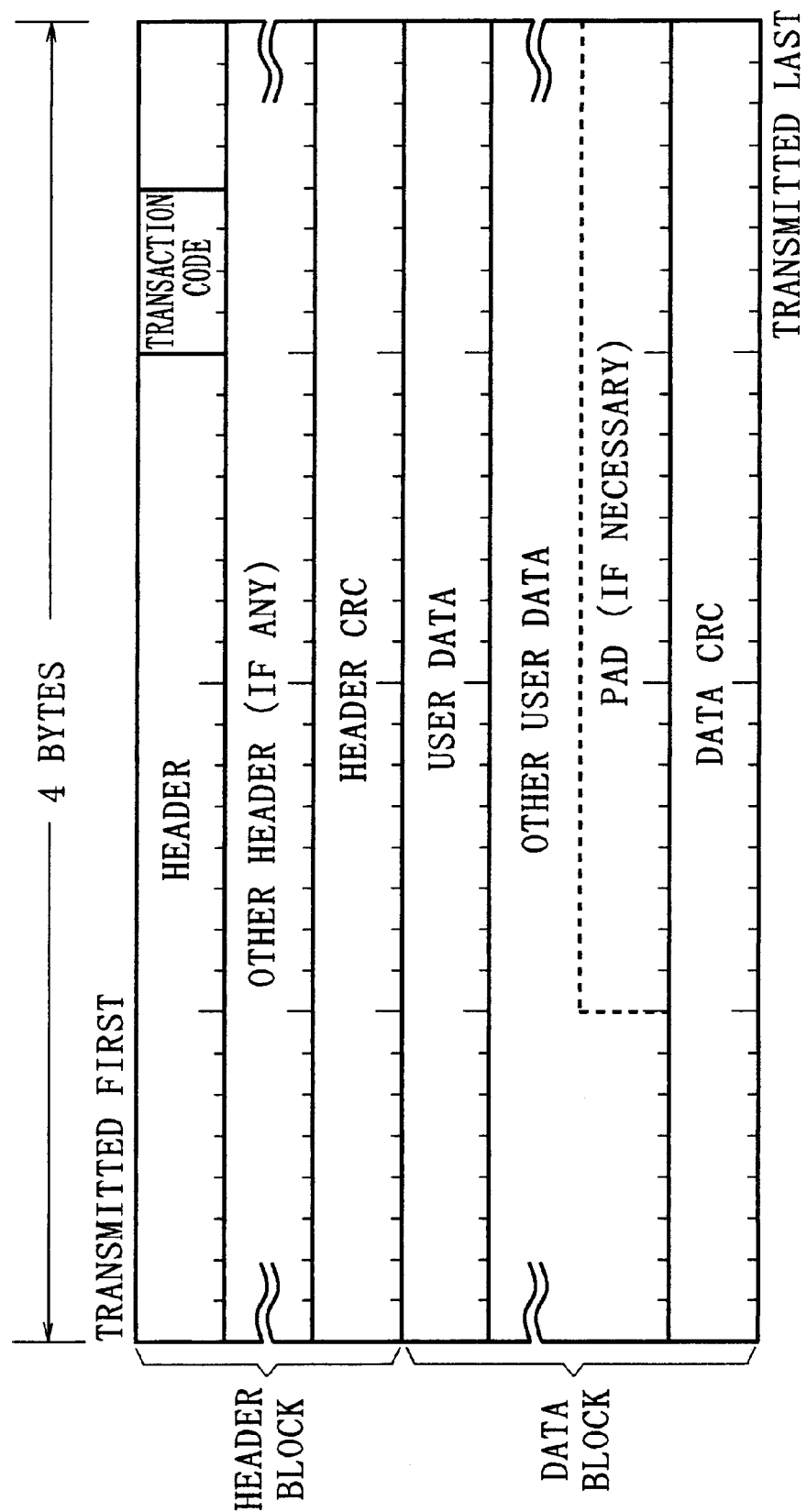
FIG. 3 is a diagram showing a basic format of an IEEE1394 standard packet.

According to the IEEE1394 standard, data is transferred at the unit of packets. FIG. 3 shows a data format used to effect the IEEE1394 standard data communication, i.e. a basic format of packet. Roughly classified, as shown in FIG. 3, this packet comprises a header, a transaction code (tcode), a header CRC (cyclic redundancy check code), user data and data CRC.

The header CRC is generated based on only a header. The IEEE1394 standard restricts nodes so as not to act on or respond to headers which are determined as being unsatisfactory by the header CRC. According to the IEEE1394 standard, the header has to contain the transaction code, and the transaction code defines the kinds of main packets.

According to the IEEE1394 standard, an isochronous packet and an asynchronous packet are available as derivatives of the packet shown in FIG. 3. The isochronous packet and the asynchronous packet may be distinguished from each other by the transaction code.

Figure 4:
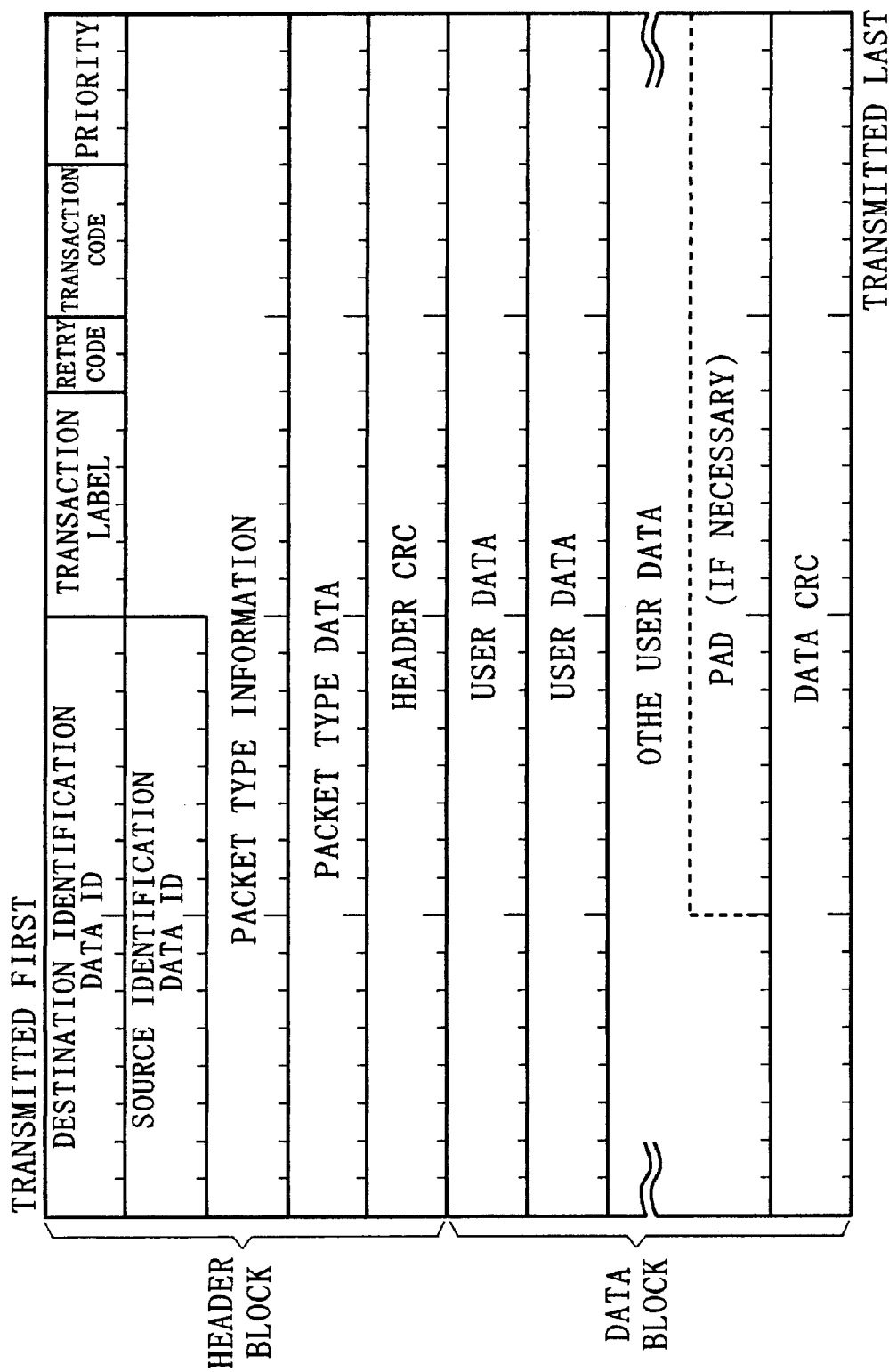
FIG. 4 is a diagram showing a data format of an IEEE1394 standard asynchronous packet.

FIG. 4 shows a data format of the asynchronous packet. In the asynchronous packet, as shown in FIG. 4, a header comprises destination node identification data (destination_ID), a transaction label (tl), a retry code (rt), a transaction code (tcode), priority information (pri), source node identification data (source_ID), packet type inherent information (destination_offset, rcode, reserved), packet type inherent data (quadlet_data, data_length, extended_tcode) and a header CRC.

Figure 5:
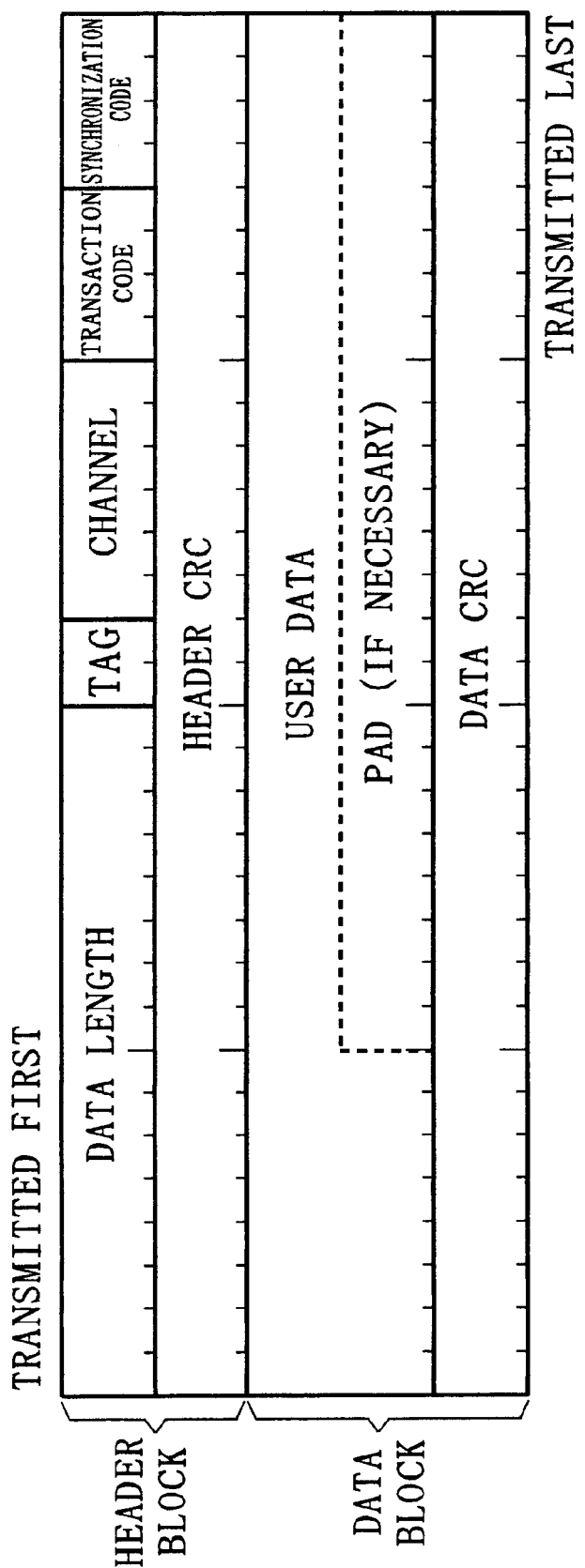
FIG. 5 is a diagram showing a data format of an IEEE1394 standard isochronous packet.

FIG. 5 shows a data format of the isochronous packet. In the isochronous packet, as shown in FIG. 5, a header comprises a data length (data_length), an isochronous data format tag (tag), an isochronous channel (channel), a transaction code (tcode), a synchronization code (sy) and a header CRC.

Although it is well-known that the above-mentioned packets (isochronous packet and asynchronous packet) according to the IEEE1394 standard are the variable-length packets, according to the embodiment of the present invention, data is transferred from a certain node WN to other WN node at the unit of fixed-length data blocks. To this end, according to the embodiment of the present invention, the fixed-length data block is generated based on packet data such as the IEEE1394 standard isochronous packet and asynchronous packet.

When the variable-length packet is longer than the fixed-length data block, the variable-length packet is divided into a plurality of variable-length packets so that data of the variable-length packets may be contained in a plurality of data blocks. In that case, there are generated three kinds of fixed-length data blocks.

FIG. 6A shows the first fixed-length data block having user data comprising only data of one packet. In this data block, as shown in FIG. 6A, a header is located ahead of the user data, and the user data is followed by a parity. This parity is an error-correcting code (ECC) for error-correcting the header and the user data. FIG. 6B shows the second fixed-length data block having user data comprising data of a plurality of packets (two packets in the illustrated example). In this data block, headers are located ahead of the two user data, and the second user data is followed by a parity. The parity is used to error-correct the whole of the headers and the two user data.

FIG. 6C shows the third fixed-length data block having user data comprising data of one or a plurality of packets (one packet in the illustrated example) and a space area with null data (empty data) attached thereto. In this data block, as shown in FIG. 6C, a header is located ahead of the user data, and the null data is followed by a parity. This parity is used to error-correct the whole of the header, the user data and the null data.

When the transfer rate is held at 24.576 Mbps, the data block comprises the parity of 8 bytes and other data of 52 bytes, and is QPSK (quadrature-phase-shift-keying)-modulated and then transferred in the form of data of 240 symbols. When the transfer rate is held at 2×24.576 Mbps, the data block comprises the parity of 16 bytes and other data of 104 bytes, and 16QAM (16 quadrature-amplitude-modulation)-modulated, and then transferred in the form of data of 240 symbols. Further, when the transfer rate is held at 4×24.576 Mbps, the data block comprises the parity of 32 bytes and other data of 208 bytes, and is 256QAM (256 quadrature-amplitude-modulation)-modulated, and then transferred in the form of data of 240 symbols.

The header is formed of 4 bytes and includes a packet ID area, a source ID area, a data-length information area, a data type information area, a divide information area and a reserve area as shown in FIG. 6A. The packet ID area has stored therein the packet ID of 7 bits, for example. The original packet maybe identified by using packet IDs "1" to "127", in that order. After the packet ID "127" was used, the packet IDs are sequentially used from the packet ID "1". The source ID area has stored therein a node ID of a source WN node. This node ID is comprised of data of 3 bits, for example, when 7 WN nodes, at maximum, constitute the wireless or radio network. A node ID of control node is "111".

Figure 7:
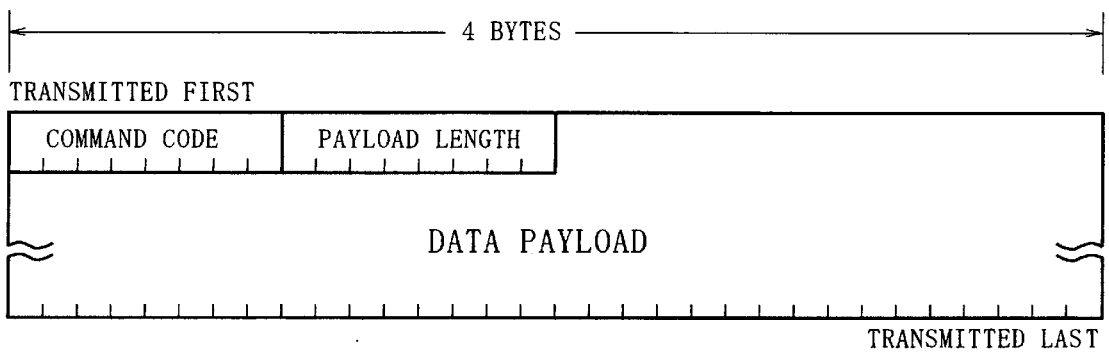
FIG. 7 is a diagram showing a data format of an access layer command.

The data length information area has stored therein information indicative of the length of user data. The data type information area has stored therein codes which are used to determine the classification of user data such as, whether user data is isochronous packet data, asynchronous packet data or access layer command data. When the user data is of the access layer command, the user data of the data block includes an access layer command whose data format is shown in FIG. 7.

The access layer command is used to transmit and receive exclusive-commands between two access layers so that setting information may be transmitted and received between the WN node serving as a control node and the WN node serving as a controlled node. Although the access layer command is located in the user data of the data block, the access layer command is completed between the access layers, and therefore need not be assembled in the form of the IEEE1394 packet. A command code is adapted to indicate the kind of the access layer command. A payload length is adapted to indicate the length of a command occupying the user data (payload) at the unit of bytes. The payload has stored therein an access layer command. The access layer command is stored in the data payload from the starting portion. When the data payload does not reach to the unit of quadlet (4 bytes), the empty portion of the data payload is filled with null data.

Referring back to FIG. 6A, the divide information area has stored therein information concerning the status of packets such as "NOT DIVIDED", "START PORTION OF DIVIDED PACKET", "MIDDLE PORTION OF DIVIDED PACKET" or "END PORTION OF DIVIDED PACKET".

Figure 8:
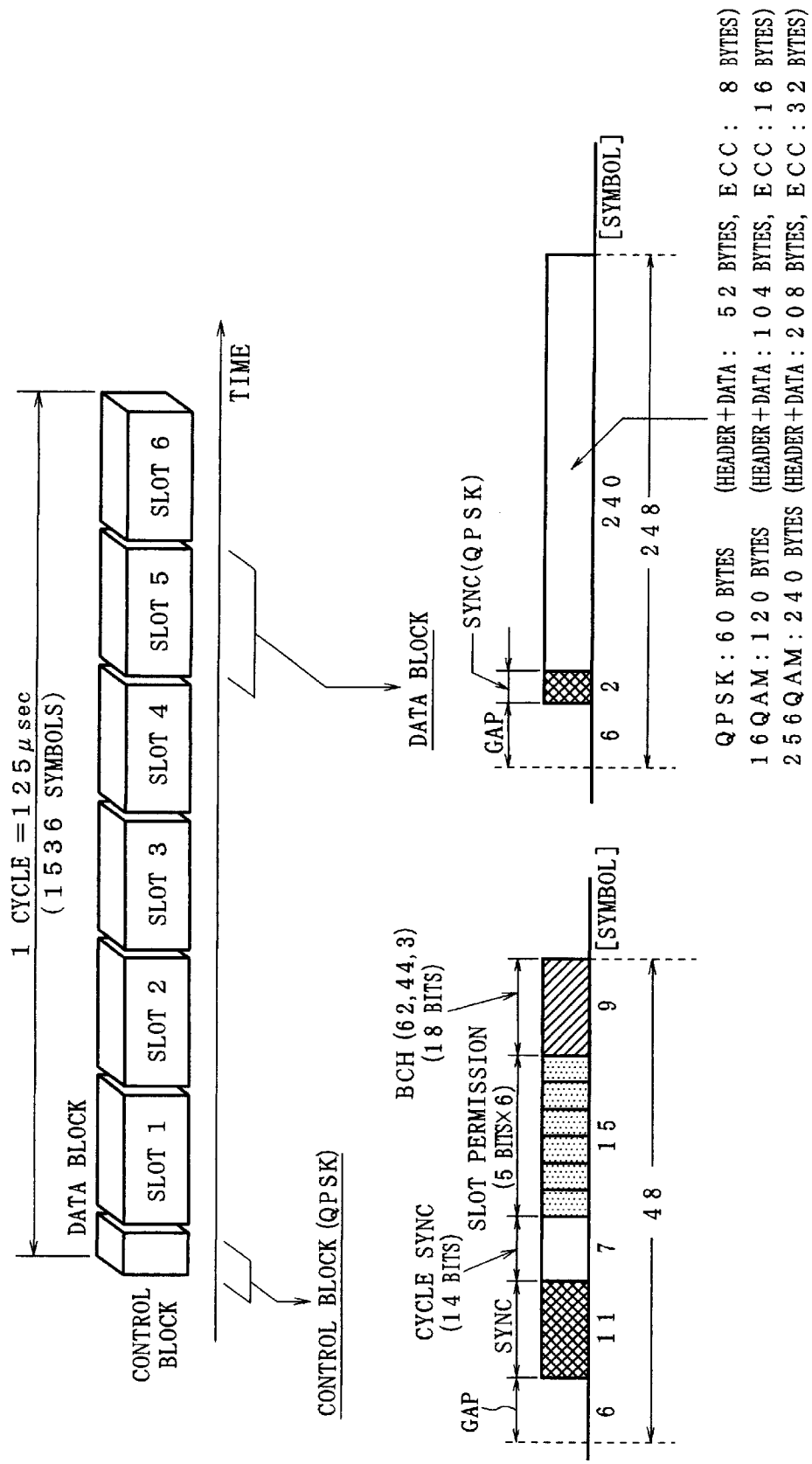
FIG. 8 is a data format of a radio communication effected by infrared rays.

As described above, the fixed-length data block generated by each WN node is transferred by effectively utilizing a plurality of time slots provided within each consecutive cycle of 125 microseconds. FIG. 8 shows a data format of a radio communication according to the embodiment of the present invention. As shown in FIG. 8, there are provided 6 time slots (time slots 1 to 6) within each cycle. One of the above-mentioned WN nodes acts as a control node, and each WN node transmits data under control of the control node.

The WN node serving as the control node transmits a control block during each cycle prior to the time slots 1 to 6. This control block is QPSK-modulated and comprises a gap area of 6 symbols, a sync area of 11 symbols, a cycle sync area of 7 symbols, a slot permission area of 15 symbols and an error-correction area of 9 symbols.

As will be described later on, the controlled node reproduces a transfer clock signal of the control node from data of this control block, and synchronizes its own transfer clock signal with the reproduced transfer clock signal of the control node. In this manner, the control block transmitted from the control node is served also as a clock synchronizing signal.

The sync area includes a sync code to detect a control block. As will be described later on, the control node includes a counter for counting a clock signal having a frequency of 24.576 MHz in an ascending order. An IEEE1394 node (time management node), referred to as a cycle master, on a bus with a control node connected thereto transfers a cycle start packet to the bus once per 125 microseconds (isochronous cycle). In that very moment, of 32-bit cycle time data in the cycle start packet, data of low-order 12 bits is set to the above-mentioned counter as a counted value thereof. In the cycle sync area of the control block, there is stored the counted value obtained from the above-mentioned counter when this control block is transferred. Remaining two bits (one symbol) of the cycle sync area are used as a reserve area.

Figure 9:
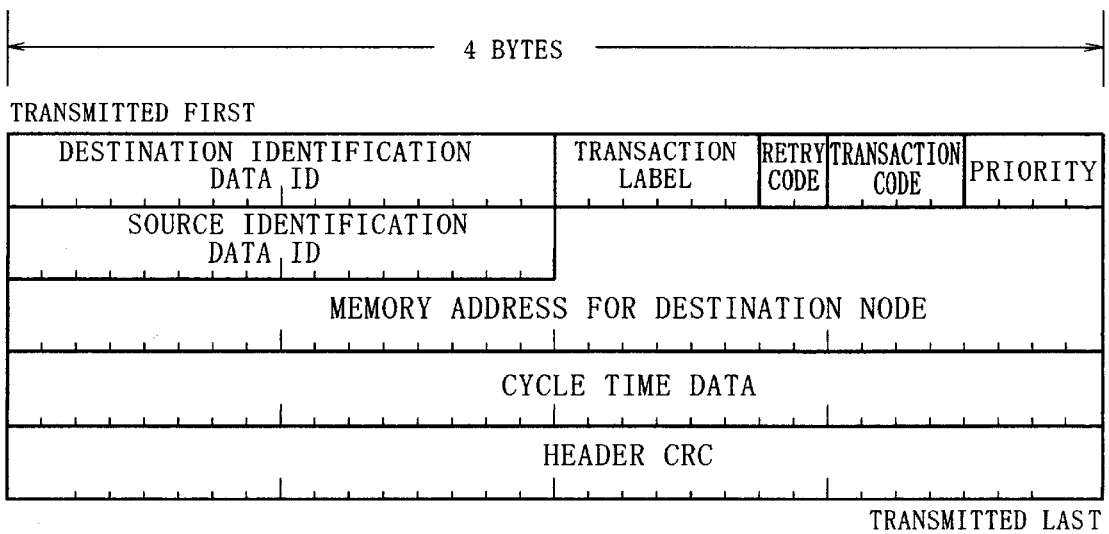
FIG. 9 is a diagram showing a data format of an IEEE1394 standard cycle start packet.
Figure 10:
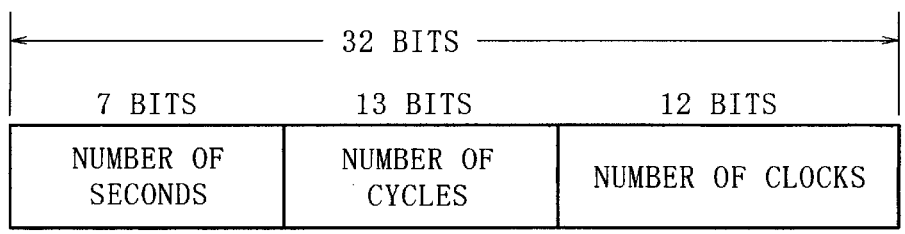
FIG. 10 is a diagram showing cycle time data.

FIG. 9 shows a data format of a cycle start packet. As shown in FIG. 9, the cycle start packet includes a header comprising destination node identification data (destination_ID), a transaction label (tl), a retry code (rt), a transaction code (tcode), priority information (pri), source node identification data (source ID), destination node memory address (destination_offset), cycle time data and a header CRC. FIG. 10 shows 32-bit cycle time data. As shown in FIG. 10, the 7 bits from the most significant bit of 32 bits are used to show the seconds, the next 13 bits are used to show the number of cycles, and the 12 bits from the least significant bit are used to show the counted value (number of clocks) of the clock signal having the frequency of 24.576 MHz.

The controlled node includes a counter for counting the clock signal having the frequency of 24.576 MHz in an ascending order as will be described later on. The IEEE1394 node (time management node), referred to as the cycle master, on the bus with the controlled node connected thereto transfers the cycle start packet to the bus once per 125 microseconds (isochronous cycle). In that very moment, of the 32-bit cycle time data contained in the cycle start packet, data of low-order 12 bits is set to the above-mentioned counter as the counted value thereof.

The WN node serving as the controlled node extracts the counted value from the cycle sync area of the control block. When a difference between the extracted counted value and the counted value of its own counter is changed relative to the initial value, the above-mentioned WN node generates a control signal for correcting such changed difference, and transmits this control signal to the cycle master, whereby relative times of all nodes may be automatically synchronized with each other at the starting portion of each cycle.

The WN node serving as the controlled node calculates a difference between the counted value stored in the cycle sync area of the control block and the counted value of its own counter, and saves the difference thus calculated as the above-mentioned initial value when a user subscribes for the radio network 1.

Turning back to FIG. 8, the control block includes the slot permission area which stores therein information of 5 bits each concerning the time slots 1 to 6. The 5-bit information is formed of bit 0 to bit 4. When the bit 4 is held at high "1" level, the bit 4 shows the transmission of a tone request signal. When the bit 4 is held at low "0" level, this time, the bit 4 shows the transmission of data. The tone request signal is adapted to transmit a tone signal in order to control a transmission power. When the bit 3 is held at high "1" level, the bit 3 shows that data is isochronous data. When the bit 3 is held at low "0" level, this time, the bit 3 shows that data is asynchronous data. The bit 2, the bit 1 and the bit 0 show node IDs of the WN nodes to permit the transmission.

The node ID of the WN node serving as the control node is set to "111". A temporarily-used node ID is used to enable a WN node without node ID to have a chance to transmit data when the above-mentioned node ID subscribes for the radio network 1. This temporarily-used node ID is set to "000". Therefore, any of "001" to "110" may be used as the node ID of the WN node serving as the controlled node.

The error-correction area has stored therein an error-correction code for correcting errors in the cycle sync area and the slot permission area. As the error-correction code, there may be used a BCH (62, 44, 3) code.

Although not shown in FIGS. 6A, 6B and 6C, in actual practice, the data block transferred by the time slots 1 to 6 includes the data area of 240 symbols having a gap area of 6 symbols and a sync area of 2 symbols attached thereto as shown in FIG. 8. The sync area has sync data to detect the data block. Sync data in the sync area is constantly QPSK-modulated regardless of the modulation system in the data area.

Figure 11:
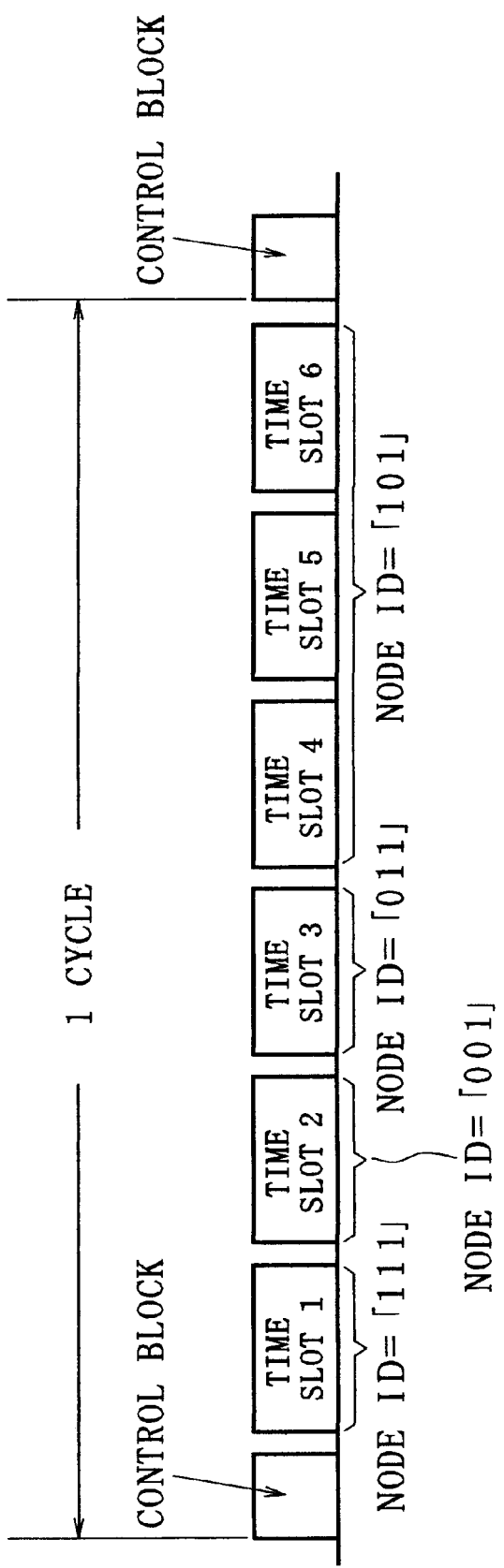
FIG. 11 is a diagram showing the manner in which time slots are allocated.

In the slot permission area of the control block, the respective time slots designate WN nodes which are able to transmit data. When WN nodes are designated, the next WN nodes, e.g. WN node of the next cycle is designated. FIG. 11 shows the manner in which the time slots 1 to 6 are respectively allocated to WN nodes. In this embodiment, the time slot 1 permits the WN node (control node) with the node ID "111" to transmit data; the time slot 2 permits the WN node with the node ID="001" to transmit data; and the time slot 3 permits the WN node with the node ID="001" to transmit data. Further, the time slots 4 to 6 permit the WN node with the node ID="101" to transmit data.

The control node is able to control the respective WN nodes (control node and controlled node) in transmission by the slot permission area of the control block. In that case, the control node becomes able to determine which node is permitted to transmit data with respect to each of the time slots in response to data transfer information of each WN node, such as a transfer width reserved by the controlled node or data situation of future transfer data reported by the controlled node. The transfer width is reserved from the controlled node to the control node and the data situation of the future transfer data is reported from the controlled node to the control node by the aforementioned access layer command.

Thus, the control node may allocate the time slot to a predetermined WN node to permit the predetermined WN node to transmit data of the reserved transfer width. Also, the control node may allocate other time slot to another WN node. Moreover, the control node is able to easily manage the maximum reserved transfer width by the number of time slots in order to make the transfer of a transfer width other than the reserved transfer width become possible. For example, with respect to data such as asynchronous packet data in which the transfer width is not reserved and which is not cyclic data, it becomes possible to transfer such data by using a time slot corresponding to the transfer width which is not reserved in the transfer of isochronous packet.

Figure 2:
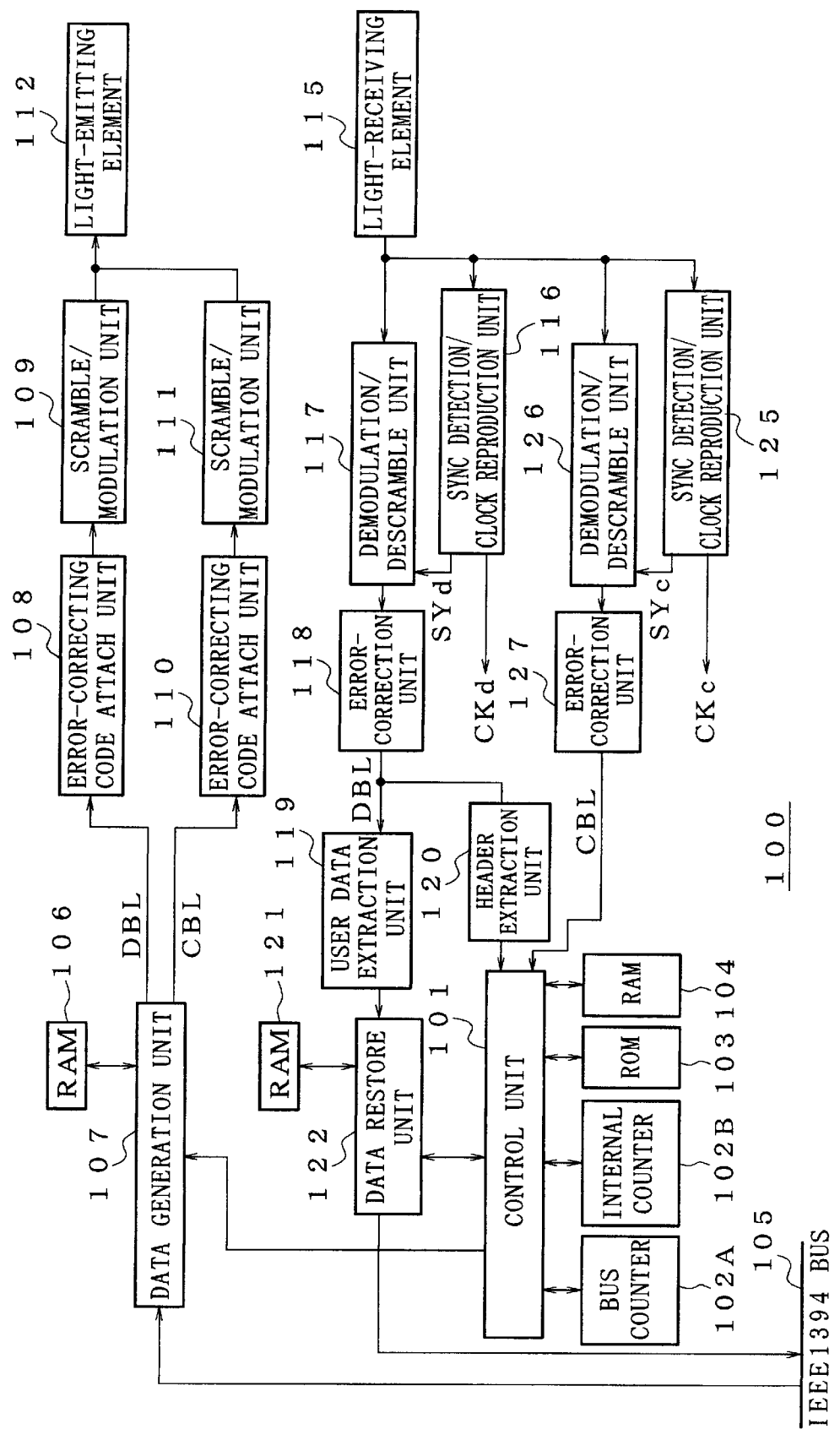
FIG. 2 is a block diagram showing a radio network node.

A WN node 100 (i.e. WN nodes 2 to 5) will be described next with reference to FIG. 2. FIG. 2 shows in block form the WN node 100 which may be served either as the control node or as the controlled node. As shown in FIG. 2, the WN node 100 includes a control unit 101 which might be formed of a microcomputer to control the entire system of the radio network. To the control unit 101 are connected a bus counter 102A, an internal counter 102B, a ROM (read-only memory) 103 for storing operation programs of the microcomputer within the control unit 101 and a RAM (random-access memory) 104 served as a work area.

The bus counter 102A and the internal counter 102B are each adapted to count the clock signal of 24.576 MHz in an ascending order. When the WN node is served as the control node, both of the bus counter 102A and the internal counter 102B are used. The IEEE1394 node (time management node), referred to as the cycle master, on the bus with the control node connected thereto is adapted to transfer the cycle start packet to the bus once per 125 microseconds (isochronous cycle). In that very moment, of the cycle time data of 32 bits contained in the cycle start packet, the number of clocks based on the low-order 12-bit data is set to the above-mentioned counters 102A, 102B as their counted value. Then, when control block data is transmitted, the control node stores 12-bit counted value (number of clocks) from the internal counter 102B in the cycle sync area, and supplies the above-mentioned counted value to the controlled node.

When on the other hand the WN node 100 is served as the controlled node, only the bus counter 102A is energized. The IEEE1394 node (time management node), referred to as the cycle master, on the bus with the control node connected thereto is adapted to transfer the cycle start packet to the bus once per 125 microseconds (isochronous cycle). In that very moment, of the cycle time data of 32 bits contained in the cycle start packet, the low-order 12-bit data is set to the above-mentioned counter 102A as its counted value. When receiving the control block, the controlled node compares the counted value extracted from the cycle sync area with the counted value of the above-mentioned counter 102A. When a difference between the aforementioned two counted values is changed relative to the initial value, the controlled node generates control information for correcting such changed difference, and supplies such control information to the cycle master, thereby establishing a time synchronization among the buses.

The WN node 100 includes a RAM 106 for temporarily storing packet data such as isochronous packet and asynchronous packet transmitted from other IEEE1394 node (not shown) connected to the IEEE1394 bus 105 and a data generation unit 107 for generating data block (only the header and the user data as shown in FIGS. 6A to 6C) DBL by using the packet data accumulated in the RAM 106 under control of the control unit 101.

When the WN node 100 is served as the control node, the data generation unit 107 generates control block (only the cycle sync area and the slot permission area as shown in FIG. 8C) CBL which is transmitted at the starting portion of each cycle of 125 microseconds. Further, the data generation unit 107 generates an access layer command used to transmit and receive an exclusive-command between the two access layers so that setting information may be transmitted and received between the control node and the controlled node. This access layer command is located in the user data of the data block and then transferred as described above. Cycle time data contained in the cycle start packet (see FIG. 9) transmitted from the cycle master (not shown) through the IEEE1394 bus 105 is supplied to the control unit 101 through the data generation unit 107.

The WN node 100 includes an error-correction code attach unit 108 for attaching an error-correction parity (ECC) to the data block DBL outputted from the data generation unit 107 and a scramble/modulation unit 109 for scrambling and modulating the outputted data from the error-correction attach unit 108 and which then attaches a sync code to the starting portion of the data thus scrambled and modulated.

The WN node 100 includes an error-correction attach unit 110 for attaching an error-correction code to the control block CBL outputted from the data generation unit 107, a scramble/modulation unit 111 for scrambling and modulating the outputted data from the error-correction code attach unit 110 and which then attaches a sync code to the starting portion of the data thus scrambled and modulated and a light-emitting element (light-emitting diode (LED)) 112 for outputting infrared signals corresponding to the modulated signals outputted from the scramble/modulation units 109, 111. When the WN node 100 is served as the controlled node, the control block CBL is not generated from the data generation unit 107, and therefore the error-correction code attach unit 110 and the scramble/modulation unit 111 need not be used.

The WN node 100 includes a light-receiving element (photodiode) 115 for receiving an infrared signal and a sync detection/clock reproduction unit 116 for outputting a detection timing signal SYd by detecting a pattern of a sync code of the data block (see FIG. 8) from an outputted signal of the light-receiving element 115 and which generates a clock signal CKd synchronized with the data block whose sync code was detected. The clock signal CKd is used when the data block whose sync code was detected is processed.

The WN node 100 includes a demodulation/descramble unit 117 for descrambling and demodulating the data block from which the sync code was detected based on the detection timing signal SYd, an error-correction circuit 118 for error-correcting the header and the user data of the data block outputted from the demodulation/descramble unit 117 by using the parity, a user data extraction unit 119 for extracting user data from the data block DBL outputted from the error-correction unit 118 and a header extraction unit 120 for extracting a header attached to the user data from the data block DBL. A header extracted by the header extraction unit 120 is supplied to the control unit 101.

The WN node 100 includes a RAM 121 for temporarily storing the user data extracted by the user data extraction unit 119 and a data restore unit 122 for restoring the packet data based on header information by using the user data accumulated in the RAM 121 and which transmits the packet data thus restored to the IEEE1394 node connected to the bus 105. When the user data is the access layer command, such command is transmitted from the data restore unit 122 to the control unit 101.

The WN node 100 includes a sync detection/clock reproduction unit 125 for outputting a detection timing signal SYc by detecting a pattern of a sync code of the control block (see FIG. 8) from the outputted signal of the light-receiving element 115 and which generates a clock signal CKc synchronized with the control block from which the sync code was detected. The clock signal CKc is used to process the control block from which the sync code was detected, and is also used as a transfer clock signal for effecting the transmission processing.

The WN node 100 includes a demodulation/descramble unit 126 for demodulating and descrambling the control block from which sync code was detected based on the detection timing signal SYc and an error-correction circuit 127 for error-correcting the control block (cycle sync area and slot permission area) CBL of the data outputted from the demodulation/descramble unit 126 by using the error-correction code and which supplies the control block thus error-corrected to the control unit 101.

When the WN node 100 is served as the control node, the demodulation/descramble unit 126 and the error-correction unit 127 are not in use. When the WN node 100 is served as the control node, the sync detection/clock reproduction unit 125 does not execute the synchronization processing with reference to the clock signal reproduced from the control block, and functions as a free-running transfer clock signal generation unit.

An operation of the WN node (wireless network node) 100 shown in FIG. 2 will be described next.

The manner in which the WN node 100 is operated when the WN node 100 is served as the control node will be described. Initially, the transmission operation will be described below.

The cycle time data contained in the cycle start packet transferred from the cycle master (not shown) is supplied to the control unit 101 from the data generation unit 107, whereby the counted values of the bus counter 102A and the internal counter 102B are set to become equal to the clocks based on the low-order 12-bit data of the cycle time data. Thereafter, these counters 102A, 102B begin to sequentially count the clock signal of 24.576 MHz in an ascending order.

Under control of the control unit 101, the data generation unit 107 generates the control block CBL (see FIG. 8) at the starting portion of each cycle of 125 microseconds. In the cycle sync area of this control block is stored the counted value (number of clocks) of the internal counter 102B. Then, the error-correction code attach unit 110 attaches the error-correction code to the control block CBL, and the descramble/modulation unit 111 descrambles and modulates the control block thus error-corrected and attaches the sync code thereto, thereby resulting in the control block transmission signal being generated. Then, the light-emitting element 112 is driven by this transmission signal, and this light-emitting element 112 outputs the control block in the form of the infrared signal.

When packet data such as an isochronous packet or an asynchronous packet is transmitted to the data generation unit 107 from the IEEE1394 node through the bus 105, this packet data is temporarily stored in the RAM 106. Then, under control of the control unit 101, the data generation unit 107 generates the data block DBL (see FIGS. 6A to 6C) from the packet data stored in the RAM 106. The data generation unit 107 generates one data block DBL each at the timing of each time slot whose transmission is permitted. Then, the error-correction code attach unit 108 attaches the error-correction code to the data block DBL. Further, the scramble/modulation unit 109 scrambles and modulates the resultant data block DBL and attaches the sync code to the same, thereby resulting in the data block transmission signal being generated. The light-emitting element 112 is driven by this transmission signal, and this light-emitting element 112 outputs the data block in the form of the infrared signal.

Next, the reception operation will be described below. The light-receiving element 115 receives the infrared signal of the data block. Then, the outputted signal from the light-receiving element 115 is supplied to the sync detection/clock reproduction unit 116 which generates the detection timing signal SYd by detecting the sync code of the data block. Also, the sync detection/clock reproduction unit 116 generates the clock signal CKd synchronized with the data block from which the sync code was detected.

Then, the outputted signal from the light-receiving element 115 is supplied to the demodulation/descramble unit 117 and thereby demodulated and descrambled based on the detection timing signal SYd. Further, the outputted data from the demodulation/descramble unit 117 is supplied to the error-correction unit 118 and thereby the data block DBL is error-corrected based on the error-correction code.

The data block DBL from the error-correction unit 118 is supplied to the header extraction unit 120 and thereby the header is extracted. The header thus extracted is supplied to the control unit 101. In a like manner, the data block DBL from the error-correction unit 118 is supplied to the user data extraction unit 119, and the user data is supplied to the data restore unit 122. The data restore unit 122 reconfigures packet data from the user data thus extracted under control of the control unit 101 based on the header information. The packet data thus reconfigured is transmitted through the bus 105 to the IEEE1394 node.

The manner in which the WN node is operated when the WN node is served as the controlled node will be described. Initially, the transmission operation will be described below.

The cycle time data contained in the cycle start packet transferred from the cycle master (not shown) is supplied to the control unit 101 from the data generation unit 107, whereby the counted value of the bus counter 102A is set to become equal to the low-order 12 bits of the cycle time data. Thereafter, the counter 102A begins to sequentially count the clock signal of 24.576 MHz in an ascending order.

When the packet data such as the isochronous packet or the asynchronous packet is transmitted to the data generation unit 107 from the IEEE1394 node through the bus 105, this packet data is temporarily stored in the RAM 106. Then, under control of the control unit 101, the data generation unit 107 generates the data block DBL (see FIGS. 6A to 6C) from the packet data stored in the RAM 106. The data generation unit 107 outputs one data block DBL each at the timing of each time slot whose transmission was permitted. Then, the error-correction code attach unit 108 attaches the error-correction code to this data block DBL, and attaches the sync code to the data block DBL after the data block DBL was scrambled and modulated by the scramble/modulation unit 109, thereby resulting in the data block transmission signal being generated. The light-emitting element 112 is driven by this transmission signal, and the light-emitting element 112 outputs the data block in the form of the infrared signal.

Next, the reception operation will be described below. The light-receiving element 115 receives the infrared signals of the control block and the data block. The outputted signal from the light-receiving element 115 is supplied to the sync detection/clock reproduction unit 125 which generates the detection timing signal SYc by detecting the sync code of the control block. Also, the sync detection/clock reproduction unit 125 generates the clock signal CKc synchronized with the control block whose sync code was detected. The clock signal CKc is used to process the control block as described above, and is also used as the transfer clock signal. That is, the aforementioned transmission operation is executed in synchronism with the transfer clock.

Then, the outputted signal from the light-receiving element 115 is supplied to the demodulation/descramble unit 126 and thereby demodulated and descrambled based on the detection timing signal SYc. Further, the outputted data from the demodulation/descramble unit 126 is supplied to the error-correction unit 127 which error-corrects the control block CBL by using the error-correction code.

The control block CBL outputted from the error-correction unit 127 is supplied to the control unit 101. The control unit 101 extracts 12-bit data from the cycle sync area of the control block CBL, and compares the extracted 12-bit data with the counted value of the counter 102A. When a difference between the extracted 12-bit data and the counted value of the counter 102A is changed from the initial value, the control unit 101 generates control information for correcting such change, and transmits the above-mentioned control information to the cycle master. Thus, the low-order 12-bit data (number of clocks) of the cycle time data in the cycle master is corrected and a time synchronization is established between the buses. Moreover, the control unit 101 may recognize the time slot whose transmission was permitted based on information of the slot permission area of the control block CBL.

The outputted signal from the light-receiving element 115 is supplied to the sync detection/clock reproduction unit 116 which generates the detection timing signal SYd by detecting the sync code of the data block. The sync detection/clock reproduction unit 116 generates also the clock signal CKd synchronized with the data block whose sync code was detected.

The outputted signal from the light-receiving element 115 is supplied to the demodulation/descramble unit 117 and thereby demodulated and descrambled based on the detection timing signal SYd. Further, the outputted data from the demodulation/descramble unit 117 is supplied to the error-correction unit 118 which then error-corrects the data block DBL by using the error-correction code.

The data block DBL from the error-correction unit 118 is supplied to the header extraction unit 120 and thereby the header is extracted. The header thus extracted is supplied to the control unit 101. Similarly, the data block DBL from the error-correction unit 118 is supplied to the user data extraction unit 119, and this user data is supplied to the data restore unit 122. The data restore unit 122 reconfigures packet data from the extracted user data under control of the control unit 101 based on the header information. The packet data thus reconfigured is transmitted through the bus 105 to the IEEE1394 node.

The manner in which the IEEE1394 standard packet data is transferred from the first WN node to the second WN node will be described with reference to FIGS. 12A through 12E.

Let us now consider the case in which packets A and B are transmitted from the IEEE1394 node to the data generation unit 107 of the first WN node as packet data after the cycle start packet (CS) was transmitted as shown in FIG. 12A. The cycle start packet is transmitted from the cycle master once per 125 microseconds. In that case, the time interval in which the cycle start packet is transmitted from the cycle master is not always limited to the time interval of 125 microseconds, and it is frequently observed that such time interval may exceed 125 microseconds depending upon the magnitude of the packet data.

The data generation unit 107 generates a fixed-length data block from these packets A and B as shown in FIG. 12B. In that case, the data generation unit 107 generates from the data lengths of the packets A and B a data block having only data of the packet A, for example, a data block having data of the packets A and B and a data block having only data of the packet B and in which null data is located in the space area. A header having information of original packet, divide information or the like is located at the starting portion of data (user data) comprising each packet.

The data block thus generated by the data generation unit 107 of the first WN node is transmitted to the second WN node from the WN node serving as the control node by using the time slots 1 to 3 whose transmissions are permitted as shown in FIG. 12C. In that case, the error-correction parity is attached to the data block, and the data block is scrambled and modulated. Thereafter, the sync code is attached to the data block, and the resultant data block is transmitted in the form of the infrared signal.

The second WN node receives the data block transmitted from the first WN node as shown in FIG. 12D. User data extracted from this data block is supplied to the data restore unit 122, and the header extracted from the data block is supplied to the control unit 101. Then, the data restore unit 122 reconfigures the original packet data from the user data based on information of original packet contained in the header, divide information or the like as shown in FIG. 12E. This packet data is transmitted to the IEEE1394 node.

Figure 13:
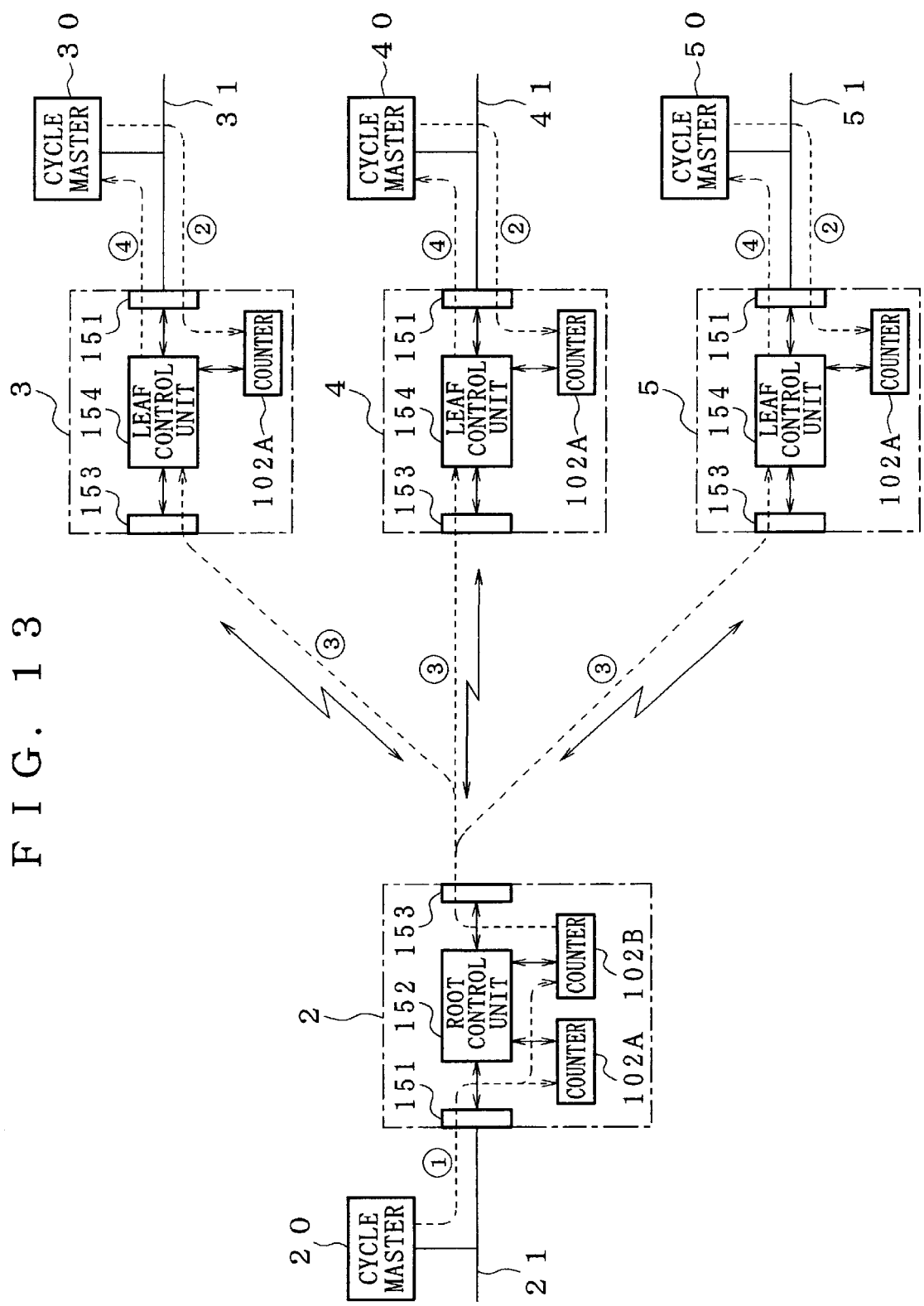
FIG. 13 is a block diagram used to explain the manner in which a time synchronization is established among buses (when the bus on the control node side is assumed to be the standard bus)

In the radio network 1 shown in FIG. 1, the manner in which a time synchronization is established among the buses will be described more in detail. This operation will be described with reference to a block diagram of FIG. 13 corresponding to the radio network 1 shown in FIG. 1. FIG. 13 shows an example in which the WN node is served as a control node (root device) and the WN nodes 3 to 5 are served as controlled nodes (leaf devices). To understand the present invention more clearly, the WN node 2 serving as the control node includes a bus connection unit 151, a route control unit 152, an infrared transmission and reception unit 153, the bus counter 102A and the internal counter 102B. Each of the WN nodes 3 to 5 serving as the controlled nodes includes the bus connection unit 151, a leaf control unit 154, the infrared transmission and reception unit 153 and the bus counter 102A. Cycle masters 20, 30, 40, 50, each of which is served as a time management node, are connected to IEEE1394 buses 21, 31, 41, 51, respectively.

A cycle master packet transferred from the cycle master 20 to the bus 21 once per 125 microseconds is supplied to the WN node 2. Of cycle time data of 32 bits contained in the cycle start packet, the number of clocks based on the low-order 12 bit-data is set to the counters 102A, 102B as their counted values (see route ① in FIG. 13). Thereafter, these counters 102A, 102B begin to sequentially count the clock signal of 24.576 MHz from the set values in an ascending order.

Figure 14:
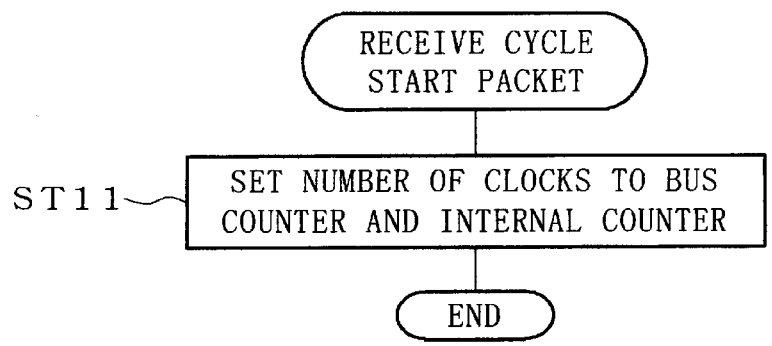
FIG. 14 is a flowchart to which reference will be made in explaining the manner in which the number of clocks is set to counters of a control node.

FIG. 14 is a flowchart to which reference will be made in explaining the manner in which the count values are set to the counters 102A, 102B of the WN node 2. Referring to FIG. 14, when the root control unit 152 of the WN node 2 receives the cycle start packet, control goes to a step ST11, whereat the root control unit 152 sets the number of clocks based on the low-order 12-bit data of the cycle time data to the bus counter 102A and the internal counter 102B. Then, the setting operation is ended.

A cycle start packet transferred from the cycle masters 30, 40, 50 to the buses 31, 41, 51 once per 125 microseconds is supplied to the WN nodes 3, 4, 5. Of the cycle time data of 32 bits contained in the cycle start packet, the number of clocks based on the low-order 12-bit data is set to the counter 102A as the counted value thereof (see routes ② in FIG. 13). Thereafter, the counter 102A begins to sequentially count the clock signal of 24.576 MHz from the set value in an ascending order.

Figure 15:
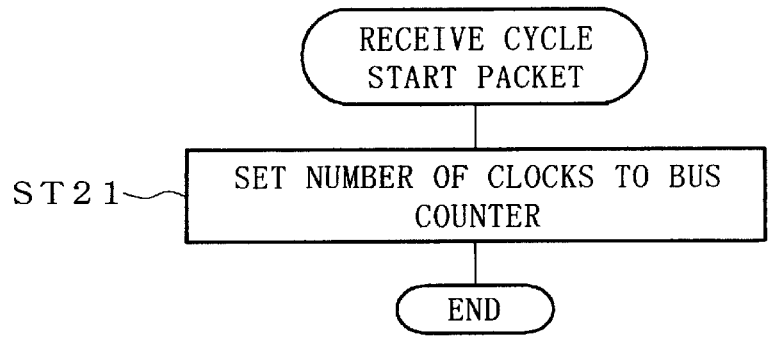
FIG. 15 is a flowchart to which reference will be made in explaining the manner in which the number of clocks is set to a counter of a controlled node.

FIG. 15 is a flowchart to which reference will be made in explaining the manner in which the counted values are set to the counters 102A of the WN nodes 3 to 5. Referring to FIG. 15, when the leaf control unit 154 of the WN nodes 3 to 5 receives the cycle start packet, control goes to a step ST21, whereat the leaf control unit 154 sets the number of clocks based on the low-order 12-bit data of the cycle time data to the bus counter 102A. Then, the setting operation is ended.

When the control block is transmitted from the WN node 2 to the WN nodes 3, 4, 5, the WN node 2 stores the counted value (number of clocks) of the internal counter 102B in the cycle sync area (see FIG. 8) of the control block and transmits the same to the WN nodes 3, 4, 5 (see routes ③ in FIG. 13).

Figure 16:
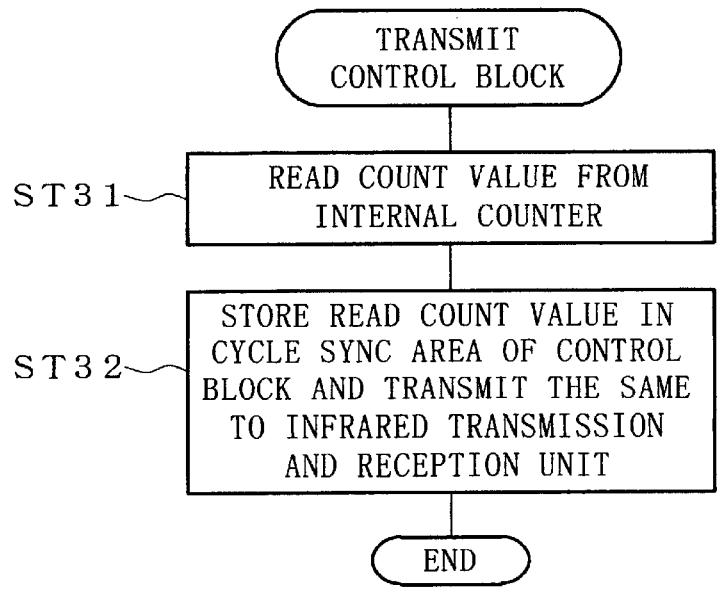
FIG. 16 is a flowchart to which reference will be made in explaining the manner in which a control node is operated when the control node transmits a control block.

FIG. 16 is a flowchart to which reference will be made in explaining the manner in which the root control unit 152 of the WN node 2 is operated when the control block data is transmitted. Referring to FIG. 16, when the control block data is transmitted, control goes to a step ST31, whereat the root control unit 152 reads the counted value from the internal counter 102B. At the next step ST32, the root control unit 152 stores the counted value thus read out in the cycle sync area of the control block, and transmits the above-mentioned control block to the infrared transmission and reception unit 133. Then, control is ended.

When the WN nodes 3, 4, 5 receive the control block from the WN node 2, the WN nodes 3, 4, 5 extract the counted values from the respective cycle sync areas, and compare the counted values with the counted value of the above-mentioned counter 102A. When it is detected that a difference between these counted values is changed relative to the initial value, the WN nodes 3, 4, 5 generate control information for correcting such changed difference, and transmit such control information to the cycle masters 30, 40, 50 (see routes ④ in FIG. 13). Thus, the data (number of clocks) of the low-order 12 bits of the cycle time data in the cycle masters 30, 40, 50 are corrected, and a time synchronization may be established among the buses.

Figure 17:
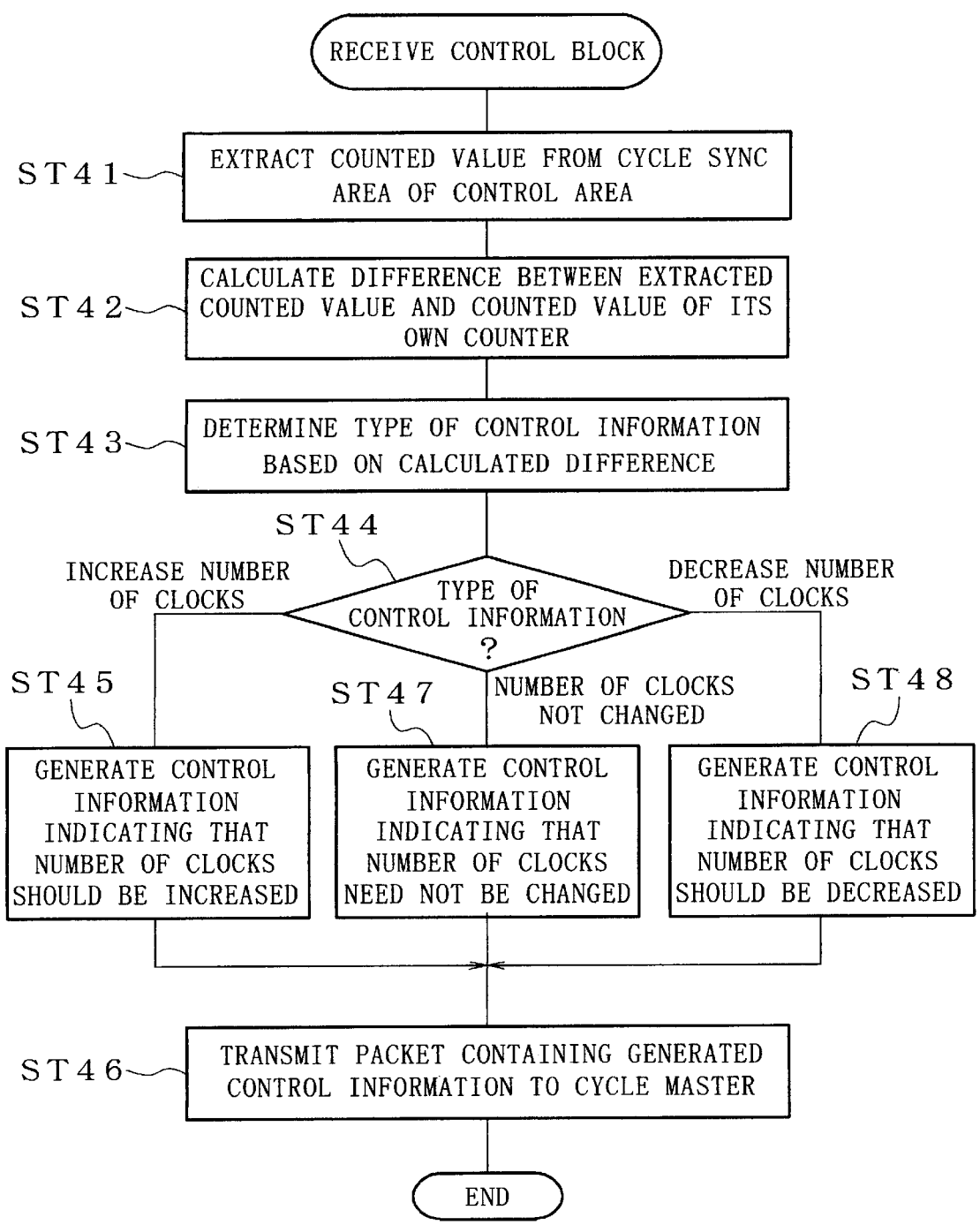
FIG. 17 is a flowchart to which reference will be made in explaining the manner in which a controlled node is operated when the controlled node receives a control block.

FIG. 17 is a flowchart to which reference will be made in explaining the manner in which the leaf control unit 154 in the WN nodes 3 to 5 is operated when the leaf control unit 154 receives the control block data. Referring to FIG. 17, when the leaf control unit 154 receives the control block, control goes to a step ST41, whereat the leaf control unit 154 extracts the counted value from the cycle sync area of the control block. Then, control goes to the next step ST42, the leaf control unit 154 calculates a difference between the counted value thus extracted and the counted value of the counter 102A.

Control goes to the next step ST43, whereat the leaf control unit 154 determines the classification of control information based on the difference thus calculated. That is, when the calculated difference is changed relative to the initial value and the number of clocks in the cycle master has to be increased, it is determined by the leaf control unit 154 that the control information is of the type indicating that the number of clocks should be increased. When the calculated difference is not changed relative to the initial value and the number of clocks in the cycle master need not be changed, it is determined by the leaf control unit 154 that the control information is of the type indicating that the number of clocks need not be changed. Further, when the calculated difference is changed relative to the initial value and the number of clocks in the cycle master has to be decreased, it is determined by the leaf control unit 154 that the control information is of the type indicating that the number of clocks should be decreased.

Control goes to the next decision step ST44, whereat the type of control information is determined by the leaf control unit 154. If it is determined by the leaf control unit 154 at the decision step ST44 that the type of control information indicates the increase of the number of clocks, then control goes to a step ST45, whereat there is generated control information for increasing the number of clocks in the cycle master so that the calculated difference may become equal to the initial value. Then, control goes to the next step ST46. If it is determined by the leaf control unit 154 at the decision step ST44 that the type of the control information indicates that the number of clocks need not be changed, then control goes to the next step ST47. At the step ST47, there is generated control information indicating that the number of clocks need not be changed. Then, control goes to the step ST46. If it is determined by the leaf control unit 154 at the decision step ST44 that the type of control information indicates that the number of clocks has to be decreased, then control goes to the next step ST48. At the step ST48, there is generated control information for decreasing the number of clocks in the cycle master so that the calculated difference may become equal to the initial value. Then, control goes to the step ST46.

At the step ST46, the packet containing the control information thus generated is transmitted through the bus to the cycle master.

As described above, according to the embodiment of the present invention, times of the IEEE1394 buses 31 to 51 to which the WN nodes 3 to 5 served as the controlled nodes are connected may be automatically adjusted by using time information (number of clocks) of the IEEE1394 bus 21 which is connected to the WN node 2 serving as the control node. Therefore, the time synchronization may be satisfactorily established among a plurality of buses.

Figures 18A, 18B, 18C:
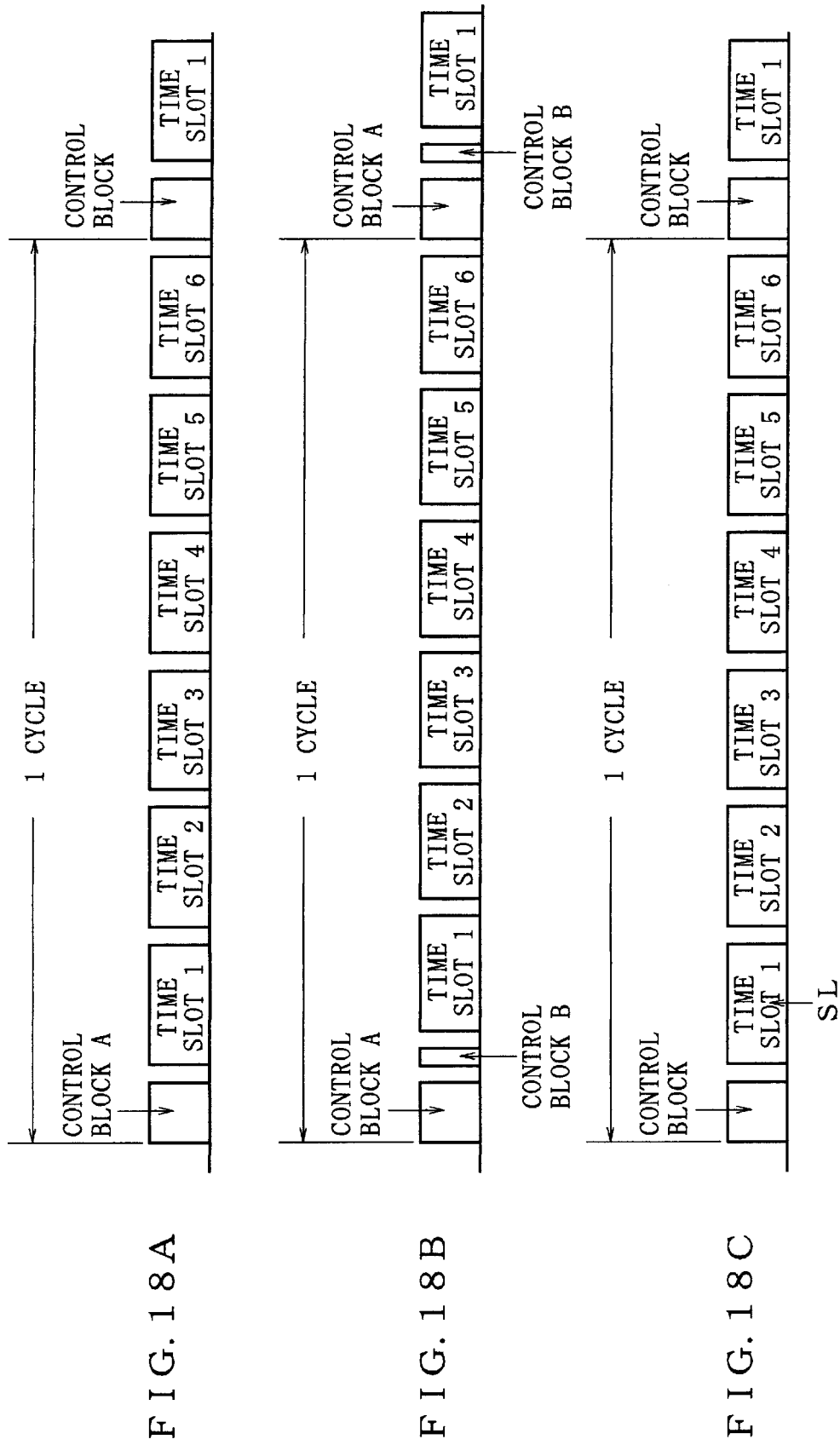
FIGS. 18A, 18B, 18C are diagrams used to explain another example of a data format of a radio communication, respectively.

While the IEEE1394 bus 21 on the control node side is assumed to be the standard bus as described above, the present invention is not limited thereto, and the present invention may be modified such that the bus on the controlled node side is assumed to be a standard bus to thereby establish a time synchronization among a plurality of buses. In that case, there is provided a control block which is used to transmit control information from the controlled node connected to the standard bus to the control node. In the above-mentioned embodiment, as shown in FIG. 18A, a control block A is transmitted from the control node to the controlled node within each cycle of 125 microseconds prior to the time slots 1 to 6. As shown in FIG. 18B, a control block B containing control information is transmitted from the controlled node connected to the standard bus to the control node after the control block A and before the time slots 1 to 6.

Figure 19:
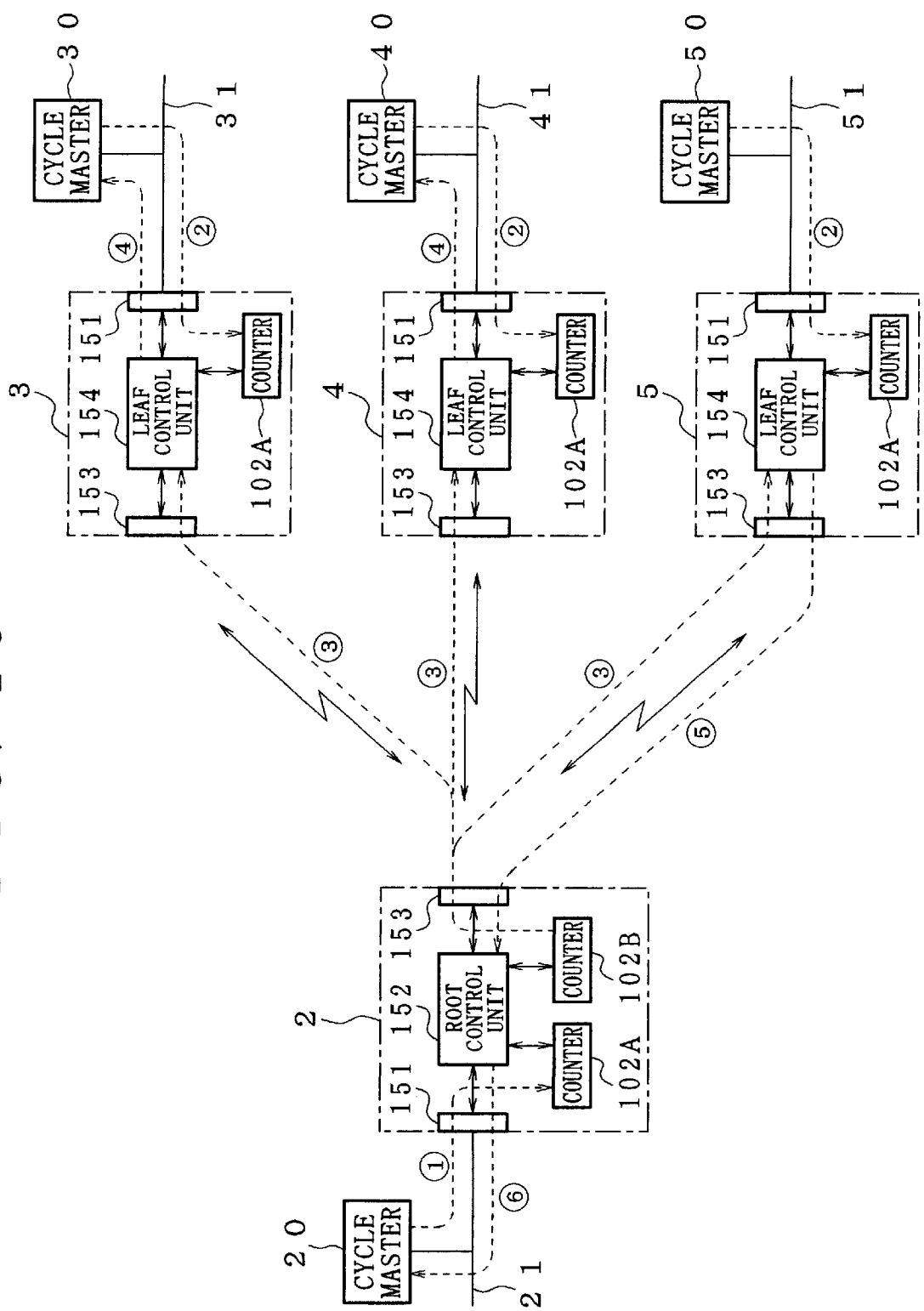
FIG. 19 is a block diagram used to explain the manner in which a time synchronization is established among buses (when the bus on the controlled node is assumed to be the standard bus)

The manner in which a time synchronization is established among a plurality of buses when the bus on the controlled node side is used as the standard bus will be described with reference to a block diagram of FIG. 19 corresponding to the radio network 1 shown in FIG. 1. FIG. 19 shows the example in which the WN node 2 is assumed to be the control node (root device), the WN nodes 3 to 5 are assumed to be the controlled nodes (leaf devices) and the bus on the WN node 5 is assumed to be the standard bus. In FIG. 19, elements and parts identical to those of FIG. 13 are marked with the same reference numerals, and therefore need not be described in detail.

As shown in FIG. 19, the cycle start packet that is transferred from the cycle master 20 to the bus 21 once per 125 microseconds is supplied to the WN node 2. Of the number of clocks of data formed of low-order 12 bits is set to the bus counter 102A as its counted value (see route ①) in FIG. 19). Thereafter, the bus counter 102A sequentially counts the clock signal of 24.576 MHz from the set value in an ascending order.

Although the internal counter 102B also sequentially counts the clock signal of 24.576 MHz in an ascending order, when the WN node 2 serving as the control node subscribes for the radio network 1, the WN node 2 calculates a difference between the counted value of the bus counter 102A and the counted value of the internal counter 102B and saves the difference thus calculated as an initial value.

Figure 20:
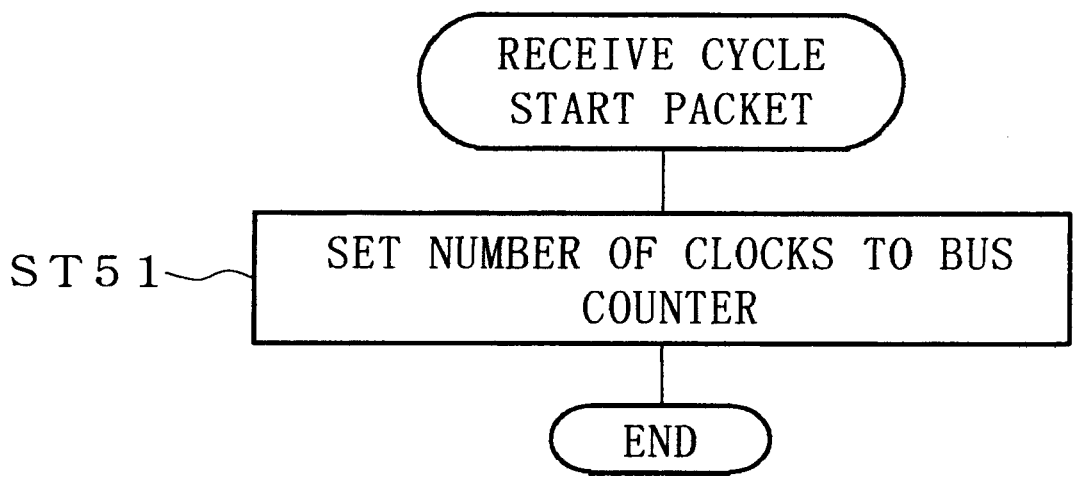
FIG. 20 is a flowchart to which reference will be made in explaining the manner in which the number of clocks is set to a counter of a control node.

FIG. 20 is a flowchart showing the manner in which the counted value is set to the counter 102A of the WN node 2. Referring to FIG. 20, when the root control unit 152 in the WN node 2 receives the cycle start packet, control goes to the next step ST51, whereat the root control unit 152 sets the number of clocks based on data of low-order 12 bits of the cycle time data to the bus counter 102A. Then, the setting operation is ended.

The cycle start packets that are transferred from the cycle masters 30, 40, 50 to the buses 31, 41, 51 once per 125 microseconds are supplied to the WN nodes 3, 4, 5. Of the cycle time data of 32 bits contained in the cycle start packet, the number of clocks based on the data of low-order 12 bits is set to the counter 102A as a counted value thereof (see routes ② in FIG. 19). Thereafter, this counter 102A sequentially counts the clock signal of 24.576 MHz from the set value in an ascending order. The processing in which the counted value is set to the counter 102A is executed in accordance with the aforementioned flowchart of FIG. 15.

When the WN node 2 transmits the control block A to the WN nodes 3, 4, 5, the WN node 2 stores the counted value (number of clocks) of the internal counter 102B in the cycle sync area of the control block A, and transmits the same (see routes ③ in FIG. 19). The root control unit 152 in the WN node 2 is operated in accordance with the aforementioned flowchart of FIG. 16.

When the WN nodes 3, 4 receive the control block A from the WN node 2, the WN nodes 3, 4 extract the counted value from the cycle sync area, and compare the counted value thus extracted and the counted value of the above-mentioned counter 102A. When it is detected that a difference between the two counted values is changed relative to the initial value, the WN nodes 3, 4 generate control information for correcting such changed difference, and transmit such control information to the cycle masters 30, 40 (see routes ④ in FIG. 19), thereby resulting in data (number of clocks) of low-order 12 bits of the cycle time data in the cycle masters 30, 40 being corrected. The leaf control units 154 in the WN nodes 3, 4 are operated in accordance with the aforementioned flowchart of FIG. 17.

When the WN node 5 receives the control block A from the WN node 2, the WN node 5 extracts the counted value from the cycle sync area, and compares the counted value thus extracted and the counted value of the above-mentioned counter 102A. When a difference between the two counted values is changed relative to the initial value, the WN node 5 generates control information for correcting such changed difference. Then, the WN node 5 generates the control block B containing such information, and transmits the control block B to the WN node 2 (see route ⑤ in FIG. 19).

Figure 21:
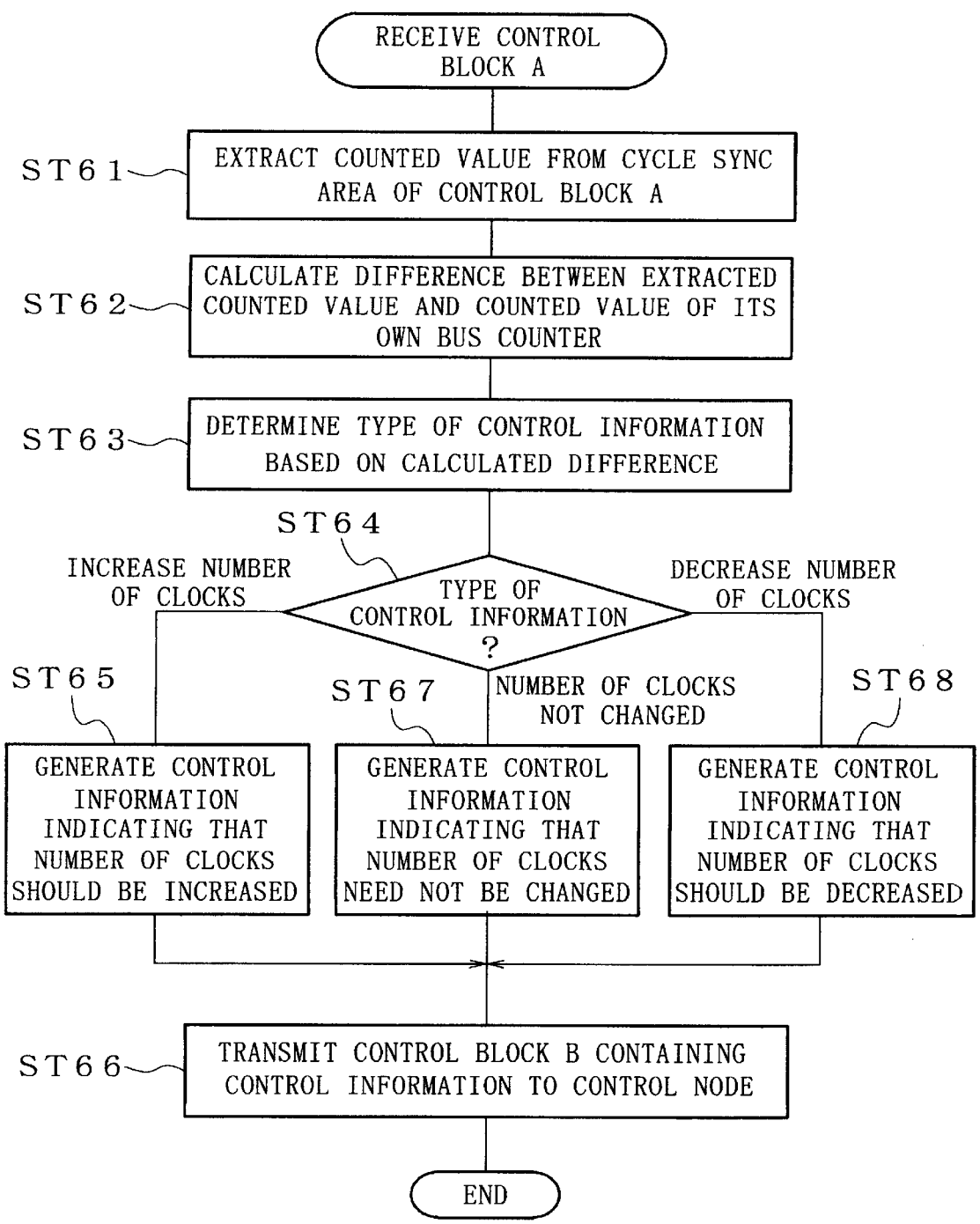
FIG. 21 is a flowchart to which reference will be made in explaining the manner in which a controlled node receives a control block A.

FIG. 21 is a flowchart showing the manner in which the leaf control unit 154 in the WN 5 node is operated when the EN node 5 receives the control block A. Referring to FIG. 21, when the WN node 5 receives the control block A, control goes to a step ST61, whereat the leaf control unit 154 extracts a counted value from the cycle sync area of the control block A. Then, control goes to the next step ST62, whereat the leaf control unit 154 calculates a difference between the counted value thus extracted and the counted value of the counter 102A.

At the next step ST63, the leaf control unit 154 determines the type of control information based on the difference thus calculated. Specifically, when the calculated difference is changed relative to the initial value and the number of clocks on the control node side has to be increased, the type of control information indicates that the number of clocks should be increased. When the calculated difference is not changed relative to the initial value and the number of clocks on the control node side need not be changed, the type of control information indicates that the number of clocks need not be increased. Further, when the calculated difference is changed relative to the initial and the number of clocks on the control node side should be decreased, the type of control information indicates that the number of clocks should be decreased.

Control goes to the next decision step ST64. If it is determined by the leaf control unit 154 at the decision step ST64 that the type of control information indicates that the number of clocks should be increased, then control goes to a step ST65, whereat the leaf control unit 154 generates control information for increasing the number of clocks (counted value) on the control node side so that the calculated difference may become equal to the initial value. Then, control goes to a step ST66. If it is determined by the leaf control unit 154 at the decision step ST64 that the type of control information indicates that the number of clocks need not be changed, then control goes to a step ST67, whereat the leaf control unit 154 generates control information indicating that the number of clocks need not be changed. Then, control goes to the step ST66. If it is determined by the leaf control unit 154 at the decision step ST64 that the type of control information indicates that the number of clocks should be decreased, then control goes to the next step ST68. At the step ST68, the leaf control unit 154 generates control information for decreasing the number of clocks (counted value) on the control node side so that the calculated difference may become equal to the initial value. Then, control goes to the step ST66.

At the step ST66, the WN node 5 generates the control block B containing the control information thus generated, and transmits the control block B to the WN node 2 serving as the control node (see FIG. 18B) at the previously-set timing (see FIG. 18B)

When on the other hand the WN node 2 receives the control block B from the WN node 5, the WN node 2 extracts control information from the control block B, and corrects the counted value of the internal counter 102B in accordance with the control information thus extracted. Thereafter, the WN node 2 compares the counted values of the counters 102A, 102B. When a difference between the two counted values is changed relative to the initial value, the WN node 2 generates control information for correcting such changed difference, and transmits the control information thus generated to the cycle master 20 (see route ⑥ in FIG. 19). Thus, data (number of clocks) of data of low-order 12 bits of the cycle time data in the cycle master 20 is corrected, and therefore a time synchronization may be established among the buses.

Figure 22:
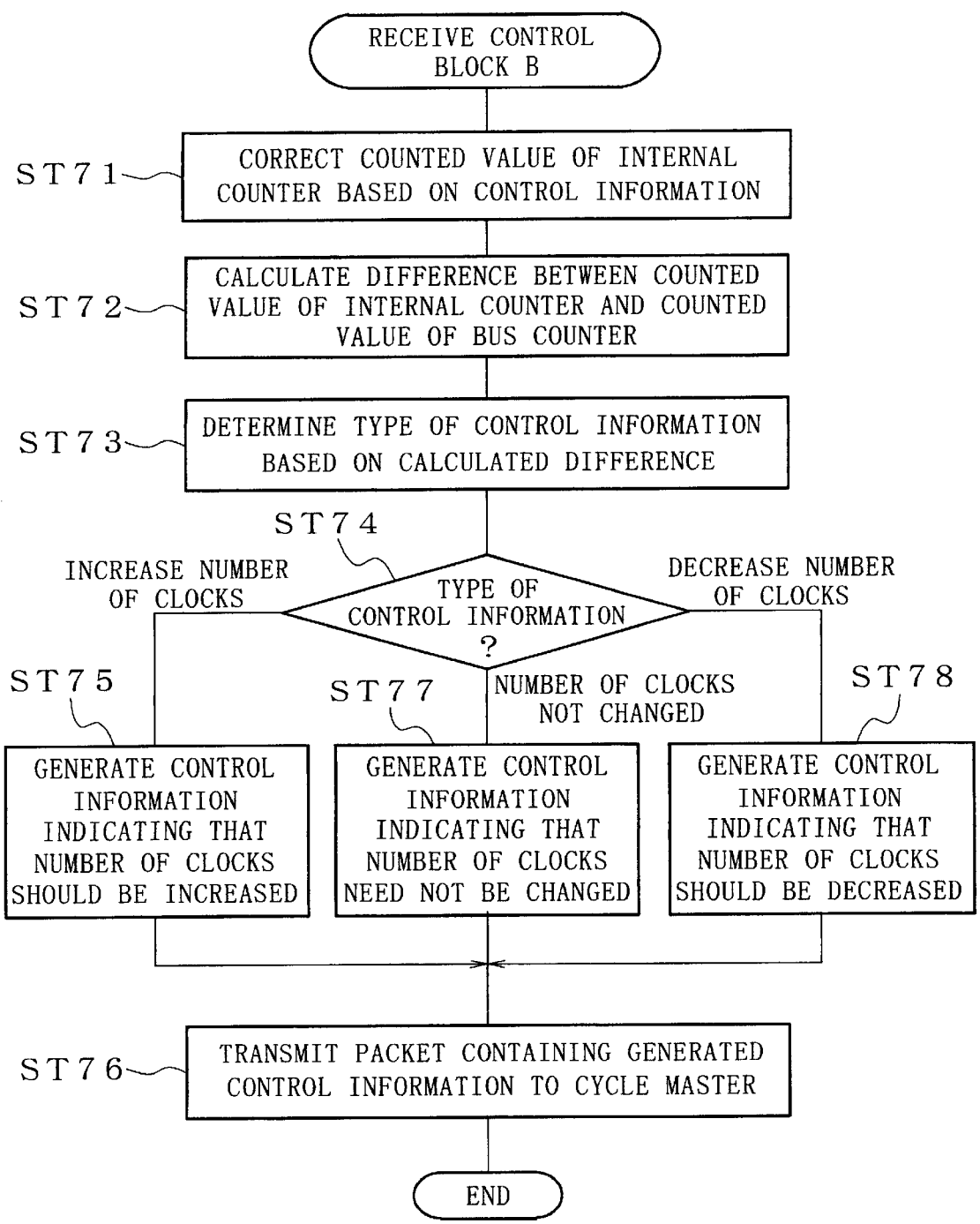
FIG. 22 is a flowchart to which reference will be made in explaining the manner in which a control node receives a control block B.

FIG. 22 is a flowchart showing the manner in which the leaf control unit 154 in the WN node 2 is operated when the WN node 2 receives the control block B. Referring to FIG. 22, when the WN node 2 receives the control block B, control goes to a step ST71, whereat the leaf control unit 154 extracts control information from the control block B, and corrects the counted value of the internal counter 102B based on the control information thus extracted. Control goes to the next step ST72, whereat the leaf control unit 154 calculates a difference between the counted value of the internal counter 102B and the counted value of the bus counter 102A.

Control goes to the next step ST73, whereat the leaf control unit 154 determines the type of control information based on the difference thus calculated. Specifically, when the difference thus calculated is changed relative to the initial value and the number of clocks in the cycle master 20 should be increased, control information is of the type that increases the number of clocks. When the difference thus calculated is not changed relative to the initial value and the number of clocks in the cycle master 20 need not be changed, control information is of the type that does not change the number of clocks. Further, when the difference thus calculated is changed relative to the initial value and the number of clocks in the cycle master 20 should be decreased, control information is of the type that decreases the number of clocks.

Control goes to the next decision step ST74, whereat the leaf control unit 154 determines the type of control information. If it is determined by the leaf control unit 154 at the decision step ST74 that control information is of the type that increases the number of clocks, then control goes to a step ST75. At the step ST75, the leaf control unit 154 generates control information for increasing the number of clocks in the cycle master 20 so that the calculated difference may become equal to the initial value, and control goes to a step ST76. If it is determined by the leaf control unit 154 at the decision step ST74 that control information is of the type that need not change the number of clocks, then control goes to a step ST77, whereat the leaf control unit 154 generates control information indicating that the number of clocks need not be changed. Then, control goes to the step ST76. If it is determined by the leaf control unit 154 at the decision step ST74 that control information is of the type that decreases the number of clocks, then control goes to a step ST78. At the step ST78, the leaf control unit 154 generates control information for decreasing the number of clocks of the cycle master 20 so that the calculated difference may become equal to the initial value. Then, control goes to the step ST76.

At the step ST76, the WN node 2 transmits the packet containing the control information thus generated through the bus 21 to the cycle master 20.

As described above, even when the bus on the controlled node side is assumed to be the standard bus, a time synchronization may satisfactorily be established among a plurality of buses.

While the control node (WN node 2) uses both of the bus counter 102A and the internal counter 102B as described above, the present invention is not limited thereto, and the control node may use only the bus counter 102A.

When the bus on the control node side is assumed to be the standard bus (see FIG. 13), the control node is operated as follows.

When the WN node serving as the control node receives the cycle start packet from the cycle master 20, of 32-bit cycle time data contained in the cycle start packet, the number of clocks formed of low-order 12-bit data is set to the bus counter 102A as a counted value thereof.

When the WN node 2 transmits the control block to the WN nodes 3, 4, 5, the WN node 2 stores the counted value (number of clocks) of the bus counter 102A in the cycle sync area of the control block and then transmits the same.

A rest of operation is similar to the operation effected when the above-mentioned control node uses both the bus counter 102A and the internal counter 102B.

When the bus on the controlled node side is assumed to be the standard bus (see FIG. 19), the WN node is operated as follows.

When the WN node 2 transmits the control block A to the WN nodes 3, 4, 5, the WN node 2 stores the counted value (number of clocks) of the bus counter 102A in the cycle sync area of the control block A, and transmits the same.

When the WN node 2 receives the control block B from the WN node 5, the WN node 2 extracts control information from the control block B. Then, the WN node 2 generates a packet containing the control information thus extracted, and transmits the packet thus generated to the cycle master 20. The cycle master 20 corrects the data (number of clocks) of low-order 12 bits of the cycle time data based on this control information.

A rest of operation is similar to the operation effected when the above-mentioned control node uses both the bus counter 102A and the internal counter 102B.

While when the bus on the controlled node side is assumed to be the standard bus to thereby establish a time synchronization among a plurality of buses, the control block B (see FIG. 18B) is used in order to transmit control information from the controlled node connected to the standard bus as described above, the present invention is not limited thereto, and data slots may be used in order to transmit the above-mentioned control information. The control node allocates a time slot SL (e.g. slot 1) for transmitting control information of the controlled node connected to the standard bus once at every cycle or several cycles by using the slot permission area of the control block as shown in FIG. 18C. Then, the controlled node transmits control information to the control node by using the aforementioned access layer command through this time slot SL.

In that case, when the WN node 5 shown in FIG. 19 receives the control block from the WN node 2, the WN node 5 extracts the counted value from the cycle sync area, and compares the counted value thus extracted and the counted value of the counter 102A. When a difference between the above-mentioned two counted values is changed relative to the initial value, the WN node 5 generates control information for correcting such changed difference. Then, the WN node 5 generates the access layer command containing the above-mentioned control information, and transmits the same to the WN node 2 (see route ⑤ in FIG. 19). The processing executed in the WN node 2 which received this access layer command is similar to that shown in FIG. 22, wherein the WN node 2 extracts control information from the access layer command, and executes the processing.

While the present invention is applied to the radio network 1 which transfers the packet data such as IEEE1394 isochronous packet and asynchronous packet as described above, the present invention is not limited thereto, and the present invention may be similarly applied to radio networks which transmit high-speed serial bus data such as USB (universal serial bus) data.

While the present invention is applied to the radio network 1 using infrared rays as a radio communication medium as described above, the present invention is not limited thereto, and may be similarly applied to other radio networks using other radio communication mediums such as radio waves and laser beams.

According to the present invention, in the radio network in which a plurality of buses are connected over radio waves, a time of other bus is adjusted by using time information of one bus on the control node side or the controlled node side, whereby a time synchronization maybe satisfactorily established among a plurality of buses. Therefore, when video data and audio data are transmitted and received between buses, a time difference among the respective buses may be prevented from being shifted. Hence, it is possible to avoid a bad influence exerted upon reproduced pictures and sounds by the shifted time difference.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A radio network comprising a plurality of buses each having data transfer rate time information and being mutually connected over radio waves, said radio network comprising:

means for extracting the time information of one bus of said plurality of buses;

means for adjusting a time of other buses of said plurality of buses by using said extracted time information of said one bus; and a radio communication unit for effecting radio communication among said plurality of buses, wherein said radio communication unit comprises one control node and more than one controlled nodes controlled by said control node and said control node is connected to said one bus and one of said controlled nodes is connected to one of said other buses.

2. The radio network as claimed in claim 1, wherein said plurality of buses have connected thereto a time management node for managing a time thereof, said control node includes time information transmission means for transmitting time information supplied thereto from the time management node on the bus connected thereto and to said one controlled node, and said controlled node includes time information reception means for receiving said time information transmitted from said control node, control information generation means for generating control information for said time adjustment by using said time information and time information from the time management node on the bus connected thereto, and control information transmission means for transmitting said control information to the time management node on the bus connected thereto.

3. The radio network as claimed in claim 2, wherein said time information is data indicative of a number of clock pulses, said control node includes a first counter for counting pulses in a clock signal in an ascending order, means for setting a counted value of said counter to become equal to the number of clock pulses determined by said data indicative of the number of clock pulses from the time management node on the bus connected thereto, and means for transmitting the counted value of said counter to said controlled node at a predetermined cycle, and said controlled node includes a second counter for counting pulses in a clock signal in an ascending order, means for setting the counted value of said counter to become equal to the number of clock pulses determined by said data indicative of the number of clock pulses from the time management node on the bus connected thereto, means for generating control information for said time adjustment by comparing the counted value of said first counter transmitted from said control node with the counted value of said second counter, and means for transmitting said control information to the time management node on the bus connected thereto.

4. A method of establishing a time synchronization among a plurality of buses in a radio network in which a control node is connected to one bus of said plurality of buses and a controlled node is connected to an other bus of said plurality of buses and radio communication is effected among said plurality of buses by said control node and said controlled node, comprising:

- a step in which said control node transmits to said controlled mode time information extracted from a time management node on the bus connected to said control node; and
- a step in which said controlled node generates control information using said time information transmitted from said control node for adjusting a time management node on a bus of said plurality of buses connected to said controlled node, whereby the time information at said control node and the time information at said controlled node are the same.

5. A method of establishing a time synchronization among a plurality of buses in a radio network in which a control node is connected to one bus of said plurality of buses and a controlled node is connected to an other bus of said plurality of buses and a radio communication is effected among said plurality of buses by said control node and said controlled node, comprising:

- a step in which said control node transmits to said controlled node time information extracted from a time management node on said one bus of said plurality of buses connected to said control node;
- a step in which a second controlled node connected to a second bus other than said one bus generates control information for a time adjustment by using time information transmitted from said control node and time information from a time management node on a bus of said plurality of buses connected thereto;
- a step in which said controlled node connected to said one bus generates control information for a time adjustment by using said time information transmitted from said control node and time information from a time management node on a bus connected thereto and transmits said control information to said control node; and
- a step in which said control node receives control information transmitted from said controlled node connected to said second bus, updates time information thereof by using said control information, generates control information for time adjustment by using said time information thereof and time information from a time management node on said one bus connected thereto, and transmits said control information thus generated to a time management node on the bus connected thereto, whereby the time information at said control node, at said controlled node, and at said second controlled node are the same.

6. A wireless network comprising:

a plurality of wireless network nodes, each having a data bus for data transfer based on respective bus timing information, wherein one of said plurality of wireless network nodes is designated a root node for providing control and remaining ones of said plurality of wireless network nodes are designated leaf nodes for being controlled, said root node including a cycle master unit for extracting the timing information of the data bus connected to the root node, a root control unit, first and second counters for counting pulses based on the timing information from the cycle master unit, and a wireless transmit and receive unit, said remaining ones of said plurality of wireless network nodes each including a cycle master unit for extracting the timing information from a respective data bus connected to the leaf node, a leaf control unit, a counter for counting pulses based on the timing information from the respective cycle master unit, and a wireless transmit and receive unit, wherein the count of the second counter of the root node is transmitted to each leaf node and each respective counter is controlled by the respective leaf control unit to the same count as said second counter, so that each data bus is synchronized with the data bus in the root node.

\* \* \* \* \*